US012581092B2

(12) United States Patent
Seregin et al.

(10) Patent No.: US 12,581,092 B2
(45) Date of Patent: Mar. 17, 2026

(54) TEMPORAL INITIALIZATION POINTS FOR CONTEXT-BASED ARITHMETIC CODING

(71) Applicant: QUALCOMM Incorporated, San Diego, CA (US)

(72) Inventors: Vadim Seregin, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 18/176,863

(22) Filed: Mar. 1, 2023

(65) Prior Publication Data

US 2023/0283782 A1      Sep. 7, 2023

Related U.S. Application Data

(60) Provisional application No. 63/362,118, filed on Mar. 29, 2022, provisional application No. 63/268,844, filed on Mar. 3, 2022.

(51) Int. Cl.
*H04N 19/152* (2014.01)
*H04N 19/172* (2014.01)
(Continued)

(52) U.S. Cl.
CPC ......... *H04N 19/152* (2014.11); *H04N 19/172* (2014.11); *H04N 19/174* (2014.11); *H04N 19/423* (2014.11)

(58) Field of Classification Search
None
See application file for complete search history.

(56) References Cited

U.S. PATENT DOCUMENTS 7,292,165 B2    11/2007    Cha et al.
8,344,917 B2    1/2013    Misra et al.
(Continued)

FOREIGN PATENT DOCUMENTS

CA      2903149 A1    7/2014
CN      101189874 A    5/2008
(Continued)

OTHER PUBLICATIONS

Alshin A., et al., "CE1 (subset B): Multi-Parameter Probability Up-Date for CABAC", Nov. 21-30, 2011, (Joint Collaborative Team on Video Coding (JCT-VC) of ITU-T SG16 WP3 and ISO/IEC JTC1/SC29/WG11), JCTVC-G764, 7th Meeting, Geneva, Nov. 18, 2011, XP030110748, 4 pages.
(Continued)

*Primary Examiner* — Xiaolan Xu

(74) *Attorney, Agent, or Firm* — QUALCOMM Incorporated

(57) ABSTRACT

A method includes determining one or more context values for at least one context used for encoding or decoding a current slice or picture, determining that a buffer for storing sets of temporal initialization points from two or more slices or pictures for context-based arithmetic coding is full, determining a first set of temporal initialization points associated with a slice or picture, from among the two or more slices or pictures, based on at least one of a slice type, a temporal identification value, or a quantization parameter (QP) value of the slice or picture, removing the first set of temporal initialization points that is associated with the slice or picture, and storing a second set of temporal initialization points associated with the current slice or picture, wherein the second set of temporal initialization points are based on the determined one or more context values.

19 Claims, 8 Drawing Sheets

(51) Int. Cl.
H04N 19/174 (2014.01)
H04N 19/423 (2014.01)

(56) References Cited

U.S. PATENT DOCUMENTS

| | | | |
|---|---|---|---|
| 8,494,865 | B2 | 7/2013 | Fuchs et al. |
| 9,191,670 | B2 | 11/2015 | Karczewicz et al. |
| 9,264,706 | B2 | 2/2016 | Karczewicz et al. |
| 9,332,259 | B2 | 5/2016 | Wang et al. |
| 9,338,449 | B2 | 5/2016 | Sole et al. |
| 9,491,463 | B2 | 11/2016 | Sole Rojals et al. |
| 9,621,921 | B2 | 4/2017 | Sole et al. |
| 9,654,772 | B2 | 5/2017 | Guo et al. |
| 10,334,248 | B2 | 6/2019 | Zhang et al. |
| 10,574,993 | B2 | 2/2020 | Zhang et al. |
| 11,233,998 | B2 | 1/2022 | Zhang et al. |
| 2004/0128156 | A1 | 7/2004 | Beringer et al. |
| 2007/0183491 | A1 | 8/2007 | Pearson et al. |
| 2008/0001796 | A1 | 1/2008 | Oshikiri et al. |
| 2009/0083245 | A1 | 3/2009 | Ayotte et al. |
| 2009/0235284 | A1 | 9/2009 | Steventon et al. |
| 2011/0002388 | A1 | 1/2011 | Karczewicz et al. |
| 2011/0285560 | A1 | 11/2011 | Chang et al. |
| 2012/0114691 | A1 | 5/2012 | Minke et al. |
| 2012/0121011 | A1 | 5/2012 | Coban et al. |
| 2012/0189049 | A1 | 7/2012 | Coban et al. |
| 2012/0230417 | A1 | 9/2012 | Sole Rojals et al. |
| 2013/0003827 | A1 | 1/2013 | Misra et al. |
| 2013/0003837 | A1 | 1/2013 | Yu et al. |
| 2013/0021972 | A1 | 1/2013 | Lim et al. |
| 2013/0083856 | A1 | 4/2013 | Sole et al. |
| 2013/0128985 | A1 | 5/2013 | He et al. |
| 2013/0142448 | A1 | 6/2013 | Park et al. |
| 2013/0188699 | A1 | 7/2013 | Joshi et al. |
| 2013/0188710 | A1 | 7/2013 | Xu et al. |
| 2013/0230097 | A1 | 9/2013 | Sole Rojals et al. |
| 2013/0235925 | A1 | 9/2013 | Nguyen et al. |
| 2013/0272373 | A1 | 10/2013 | Wong et al. |
| 2013/0272378 | A1 | 10/2013 | Sole Rojals et al. |
| 2013/0272384 | A1 | 10/2013 | Yu et al. |
| 2013/0336409 | A1 | 12/2013 | He et al. |
| 2014/0003533 | A1 | 1/2014 | He et al. |
| 2014/0328396 | A1 | 11/2014 | Guo et al. |
| 2014/0355679 | A1 | 12/2014 | Rosewarne |
| 2014/0362926 | A1 | 12/2014 | Rosewarne et al. |
| 2015/0016524 | A1 | 1/2015 | Henry et al. |
| 2015/0023409 | A1 | 1/2015 | Schierl et al. |
| 2015/0120798 | A1 | 4/2015 | Jeong et al. |
| 2015/0131738 | A1 | 5/2015 | Esenlik et al. |
| 2015/0215646 | A1 | 7/2015 | Piao et al. |
| 2015/0334425 | A1* | 11/2015 | He ........................ H04N 19/174 |
| | | | 375/240.03 |
| 2016/0043735 | A1 | 2/2016 | Zhou |
| 2016/0094474 | A1 | 3/2016 | Sahoo et al. |
| 2016/0353111 | A1 | 12/2016 | Zhang et al. |
| 2016/0353113 | A1 | 12/2016 | Zhang et al. |
| 2017/0094271 | A1 | 3/2017 | Liu et al. |
| 2019/0158837 | A1 | 5/2019 | Zhang et al. |
| 2021/0014480 | A1* | 1/2021 | George ................ H04N 19/105 |
| 2021/0227222 | A1 | 7/2021 | Lee et al. |
| 2021/0314630 | A1 | 10/2021 | Misra et al. |

FOREIGN PATENT DOCUMENTS

| | | | |
|---|---|---|---|
| CN | 102231830 | A | 11/2011 |
| CN | 103141098 | A | 6/2013 |
| CN | 103327316 | A | 9/2013 |
| CN | 103918260 | A | 7/2014 |
| CN | 103931188 | A | 7/2014 |
| CN | 104054347 | A | 9/2014 |
| CN | 104067524 | A | 9/2014 |
| CN | 104205830 | A | 12/2014 |
| CN | 104205832 | A | 12/2014 |
| EP | 2696582 | A2 | 2/2014 |
| EP | 2945383 | A1 | 11/2015 |
| JP | 2008011204 | A | 1/2008 |
| JP | 2013150326 | A | 8/2013 |
| JP | 2014509158 | A | 4/2014 |
| JP | 2014090326 | A | 5/2014 |
| JP | 2014515894 | A | 7/2014 |
| JP | 2014523150 | A | 9/2014 |
| JP | 2014525172 | A | 9/2014 |
| JP | 2015507424 | A | 3/2015 |
| JP | 2015507884 | A | 3/2015 |
| JP | 2015513291 | A | 4/2015 |
| KR | 100703773 | B1 | 4/2007 |
| TW | 201352010 | A | 12/2013 |
| WO | 2012122286 | A1 | 9/2012 |
| WO | 2013003798 | A1 | 1/2013 |
| WO | 2013067156 | A1 | 5/2013 |
| WO | 2013109357 | | 7/2013 |
| WO | 2013109382 | | 7/2013 |
| WO | 2013153226 | A2 | 10/2013 |
| WO | 2013154866 | | 10/2013 |
| WO | 2013155486 | | 10/2013 |
| WO | 2013158566 | A1 | 10/2013 |
| WO | 2023167997 | A1 | 9/2023 |

OTHER PUBLICATIONS

Bossen F., "Common Test Conditions and Software Reference Configurations", Joint Collaborative Team on Video Coding (JCT-VC) of ITU-T SG16 WP3 and ISO/IEC JTC1/SC29/WG11, 12th Meeting: Geneva, CH Jan. 14-23, 2013, JCTVC-L1100, 4 Pages.

Bross B., et al., "High Efficiency Video Coding (HEVC) Text Specification Draft 10 (for FDIS & Last Call)," Joint Collaborative Team on Video Coding (JCT-VC) of ITU-T SG 16 WP 3 and ISO/IEC JTC 1/SC 29/WG 11, Document: JCTVC-L1003_v34, 12th Meeting, Geneva, CH, Jan. 14-23, 2013, entire document, 310 pages.

Bross B., et al., "High Efficiency Video Coding (HEVC) Text Specification Draft 6", JCTVC-H1003 version 22, Joint Collaborative Team on Video Coding (JCT-VC) of ITU-T SG16 WP3 and ISO/IEC JTC1/SC29/WG11, 8th Meeting, San Jose, CA, USA, 99. MPEG Meeting, Feb. 1-10, 2012, 34, 54-55, 74-75, 90-98, 220-224, URL: http://wftp3.itu.int/AV-ARCH/JCTVC-SITE/, XP030111769, 259 Pages, 20120402.

Bross B., et al., "High Efficiency Video Coding (HEVC) Text Specification Draft 7," JCTVC-I1003 d2, 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.1tu.int/av-arch/jctvc-site/ , No. JCTVC-I1003, May 10, 2012 (May 10, 2012), XP030112373, 290 pages.

Bross B., et al., "High Efficiency Video Coding (HEVC) Text Specification Draft 8", Jul. 11-20, 2012, 10. JCT-VC Meeting, 101. MPEG Meeting, Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J1003_d7, XP030112947, Jul. 28, 2012 (Jul. 28, 2012), pp. 197-201, section A.4.1 ,A.4.2, 260 Pages.

Bross B., et al., "WD4: Working Draft 4 of High-Efficiency Video Coding", 6th Meeting, Torino, IT, Jul. 14-22, 2011; Joint Collaborative Team on Video Coding of ISO/IEC JTC1/SC29/WG11 and ITU-TSG.16) JCTVC-F803_d2, Oct. 4, 2011, 226 pp.

Bross B., et al., "WD5: Working Draft 5 of High-Efficiency Video Coding," JCTVC-G1103_d2, (JCT-VC) of ITU-T SG16 WP3 and ISO/IEC JTC1/SC29/WG11 Joint Collaborative Team on Video Coding, 7th Meeting, Geneva, Switzerland (Nov. 2011), 214 pages.

Bross et al., et al., "High Efficiency Video Coding (HEVC) text specification draft 9" 11th Meeting: Shanghai, CN, Oct. 10-19, 2012, JCTVC-K1003_v7, 290 pp.

Chen J., et al., "Coding Tools Investigation for Next Generation Video Coding", ITU-T SG 16, Contribution 806, COM16-C806-E, Draft, Study Period 2013-2016, International Telecommunication Union, Geneva, CH, vol. 6/16, Jan. 27, 2015 (Jan. 27, 2015), XP044083237, pp. 1-7. [Retrieved on Jan. 27, 2015].

Chen J., et al., "Further Improvements to HMKTA-1.1", 52. VCEG Meeting, Jun. 19, 2015-Jun. 26, 2015, Warsaw, Poland, (Video

(56)                References Cited

OTHER PUBLICATIONS

Coding Experts Group of ITU-T SG.16), No. VCEG-AZ07_V3, Jun. 25, 2015 (Jun. 25, 2015), XP030003886, 8 Pages.

Chien W-J., et al., "Extension of Advanced Temporal Motion Vector Predictor (ATMVP)", ITU-Telecommunications Standardization Sector Study Group 16 Question 6 Video Coding Experts Group (VCEG), 52nd Meeting: 52. VCEG Meeting; Jun. 19, 2015-Jun. 26, 2015 (Jun. 19-26, 2015); Warsaw; Poland (Video Coding Experts Group of ITU-T SG.16), Jun. 25, 2015 (Jun. 25, 2015), No. VCEG-AZ10_r1, XP030003891, 8 Pages.

Chien W-J., et al., "Template-Based Context Modeling for Coefficient Coding", 100, MPEG Meeting; Apr. 30, 2012-May 4, 2012; 9th Meeting, Geneva; (Motion Picture Expert Group or ISO/IEC JTC1/SC29/WG11), No. m24632, JCTVC-0383, Apr. 25, 2012 (Apr. 25, 2012), XP030052975, pp. 1-5, Apr. 27, 2012-May 7, 2015.

Chiu Y-J., et al., "Decoder-Side Motion Estimation and Wiener Filter for HEVC", 2013 Visual Communications and Image Processing (VCIP), IEEE, Nov. 17, 2013 (Nov. 17, 2013), 6 pages, XP032543658, DOI: 10.1109/VCIP.2013.6706446, [retrieved on Jan. 8, 2014].

Coban M., et al., "Algorithm Description of Enhanced Compression Model 3 (ECM 3)", JVET-X2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-28.

Coban M., et al., "Algorithm Description of Enhanced Compression Model 4 (ECM 4)", JVET-Y2025-v2, Joint Video Experts Team (JVET) of ITU-T SG 16 WP 3 and ISO/IEC JTC 1/SC 29, 23rd Meeting, by teleconference, Jul. 7-16, 2021, pp. 1-32.

Guo, et al., "CE6 Subset d: Intra Prediction with Secondary Boundary," Joint Collaborative Team on Video Coding (JCT-VC) of ITU-T SG16 WP3 and ISO/IEC JTC1/SC29/WG11 7th Meeting: Geneva, CH, Nov. 21-30, 2011, Document: JCTVC-G280, pp. 1-7.

Guo X., et al., "Ordered Entropy Slices for Parallel CABAC," [online], ITU-Telecommunications Standardization Sector Study Group 16 Question 6,May 2, 2009 Document: VCEG-AK25, Dec. 21, 2015, URL : http://wftp3.itu.int/av-arch/video-site/0904_Yok/VCEG-AK25.zip , 4 pages.

International Search Report and Written Opinion—PCT/US2023/014372—ISA/EPO—Apr. 26, 2023.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Liu H., et al., "Local Illumination Compensation", 52, VCEG Meeting, Jun. 19, 2015-Jun. 26, 2015, Warsaw, (Video Coding Experts Group of ITU-T SG.16), No. VCEG-AZ06, Jun. 18, 2015 (Jun. 18, 2015), 4 Pages, XP030003883.

Marpe D., et al., "Context-Based Adaptive Binary Arithmetic Coding in the H.264/AVC Video Compression Standard", IEEE Transaction on Circuits and Systems for Video Technology, IEEE Service Center, Piscataway, NJ, US, vol. 13, No. 7, Jul. 1, 2003 (Jul. 1, 2003), XP011099255, XP002509017, pp. 620-636, section III, C.2, p. 632, ISSN: 1051-8215, DOI:10.1109/TCSVT.2003.815173.

Nguyen, et al., "Non-CE11: Proposed Cleanup for Transform Coefficient Coding," Document JCTVC-H0228, Joint Collaborative Team on Video Coding (JCT-VC) of ITU-T SG16 WP3 and ISO/

IEC JTC1/SC29/WG11, 8th Meeting: San José, CA, USA, XP030111255, Feb. 1-10, 2012, pp. 1-9.

Nguyen T., et al., "Improved Context Modeling for Coding Quantized Transform Coefficients in Video Compression", Dec. 8, 2010, 28th Picture Coding Symposium, PCS2010, Dec. 8, 2010-Dec. 10, 2010; pp. 378-381, Nagoya, XP030082008, DOI: 10.1109/PCS.2010.5702513.

Said A., et al., "CE5: CABAC Probability Initialization from previous Inter Frames (test C1)", Joint Video Experts Team (JVET) of ITU-T SG 16 WP 3 and ISO/IEC JTC 1/SC 29/WG 11, JVET-K0379-v2, Jul. 10-18, 2018, Doc: JVET-K0379-v1, 4 pages.

Schwarz H., et al., "CABAC and Slices," Joint Video Team (JVT) of ISO/IEC MPEG & ITU-T VCEG (ISO/IEC JTC1SC29/WG11 and ITU-T SG16 Q.6, No. JVT-D020r1, Jul. 22, 2002 (Jul. 22, 2002), pp. 1-17, XP002671680, Retrieved from the Internet: URL: http://wftp3.itu.int/av-arch/jvt-site/2002_07_Klagenfurt.

Seregin V., et al., "AHG12: CABAC Initialization from Previous Inter Slice", JVET-Y0181-v3, Joint Video Experts Team (JVET) of ITU-T SG 16 WP 3 and ISO/IEC JTC 1/SC 29, 25th Meeting, by teleconference, Jan. 12-21, 2022, pp. 1-4.

Seregin V., et al., "EE2-4.2: CABAC Initialization from Previous Inter Slice and Windows Adjustment", JVET-Z0133-v1, Joint Video Experts Team (JVET) of ITU-T SG 16 WP 3 and ISO/IEC JTC 1/SC 29, 26th Meeting, by teleconference, Apr. 20-29, 2022, pp. 1-6.

Seregin V., et al., "Exploration Experiment on Enhanced Compression beyond VVC capability (EE2)", JVET-Y2024-v2, Joint Video Experts Team (JVET) of ITU-T SG 16 WP 3 and ISO/IEC JTC 1/SC 29, 25th Meeting, by teleconference, Jan. 12-21, 2022, pp. 1-15.

Sole J., et al., "Transform Coefficient Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1765-1777, XP011487805, ISSN: 1051-8215, DOI: 10.1109/TCSVT.2012.2223055.

Sze V., et al., "High Throughput CABAC Entropy Coding in HEVC", IEEE Transactions on Circuits and Systems for Video Technology, IEEE Service Center, Piscataway, NJ, US, vol. 22, No. 12, Dec. 1, 2012 (Dec. 1, 2012), pp. 1778-1791, XP011487151, ISSN: 1051-8215, DOI: 10.1109/TCSVT.2012.2221526.

VCodex, "H.264/AVC Context Adaptive Binary Arithmetic Coding (CABAC)", https://www.vcodex.com/h264avc-context-adaptive-binary-arithmetic-coding-cabac/, 2022, pp. 1-5.

Wang Y-K., et al., "High Efficiency Video Coding (HEVC) Defect Report", Joint Collaborative Team on Video Coding (JCT-VC) of ITU-T SG 16 WP 3 and ISO/IEC JTC 1/SC 29/WG 11, Doc. JCTVC-N1003_v1, 14th Meeting, Vienna, AT, Jul. 25-Aug. 2, 2013, 311 pages.

Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.

Wiegand T., et al., "WD1: Working Draft 1 of High-Efficiency Video Coding", JCTVC-C403, Joint Collaborative Team on Video Coding (JCT-VC), of ITU-T SG16 WP3 and ISO/IEC JTC1/SC29/WG11, 3rd Meeting: Guangzhou, CN, Oct. 7-15, 2010, 137 Pages.

Wiegand T., et al., "WD3: Working Draft 3 of High-Efficiency Video Coding", JCTVC-E603_d8, Joint Collaborative Team on Video Coding (JCT-VC) of ITU-T SG16 WP3 and ISO/IEC JTC1/SC29/WG11, XP030009014, Document JCTVC-E603, 5th Meeting, Geneva, CH, Mar. 16-23, 2011, 239 Pages.

Xiu X., et al., "AHG12: Improved Probability Estimation for CABAC", JVET-Y0157-v2, Joint Video Experts Team (JVET) of ITU-T SG 16 WP 3 and ISO/IEC JTC 1/SC 29, 25th Meeting, by teleconference, Jan. 12-21, 2022, 12 pages.

Xiu X., et al., "EE2—Test4.3: Combined Tests of EE2-4.1 and EE2-4.2", JVET-Z0135-v2, Joint Video Experts Team (JVET) of ITU-T SG 16 WP 3 and ISO/IEC JTC 1/SC 29, 26th Meeting, by teleconference, Apr. 20-29, 2022, pp. 1-5.

* cited by examiner

400

PREDICT CURRENT BLOCK

402

CALCULATE RESIDUAL BLOCK
FOR CURRENT BLOCK

404

TRANSFORM AND QUANTIZE
RESIDUAL BLOCK

406

SCAN TRANSFORM
COEFFICIENTS OF RESIDUAL
BLOCK

408

ENTROPY ENCODE
TRANSFORM COEFFICIENTS

410

OUTPUT ENTROPY ENCODED
DATA OF BLOCK

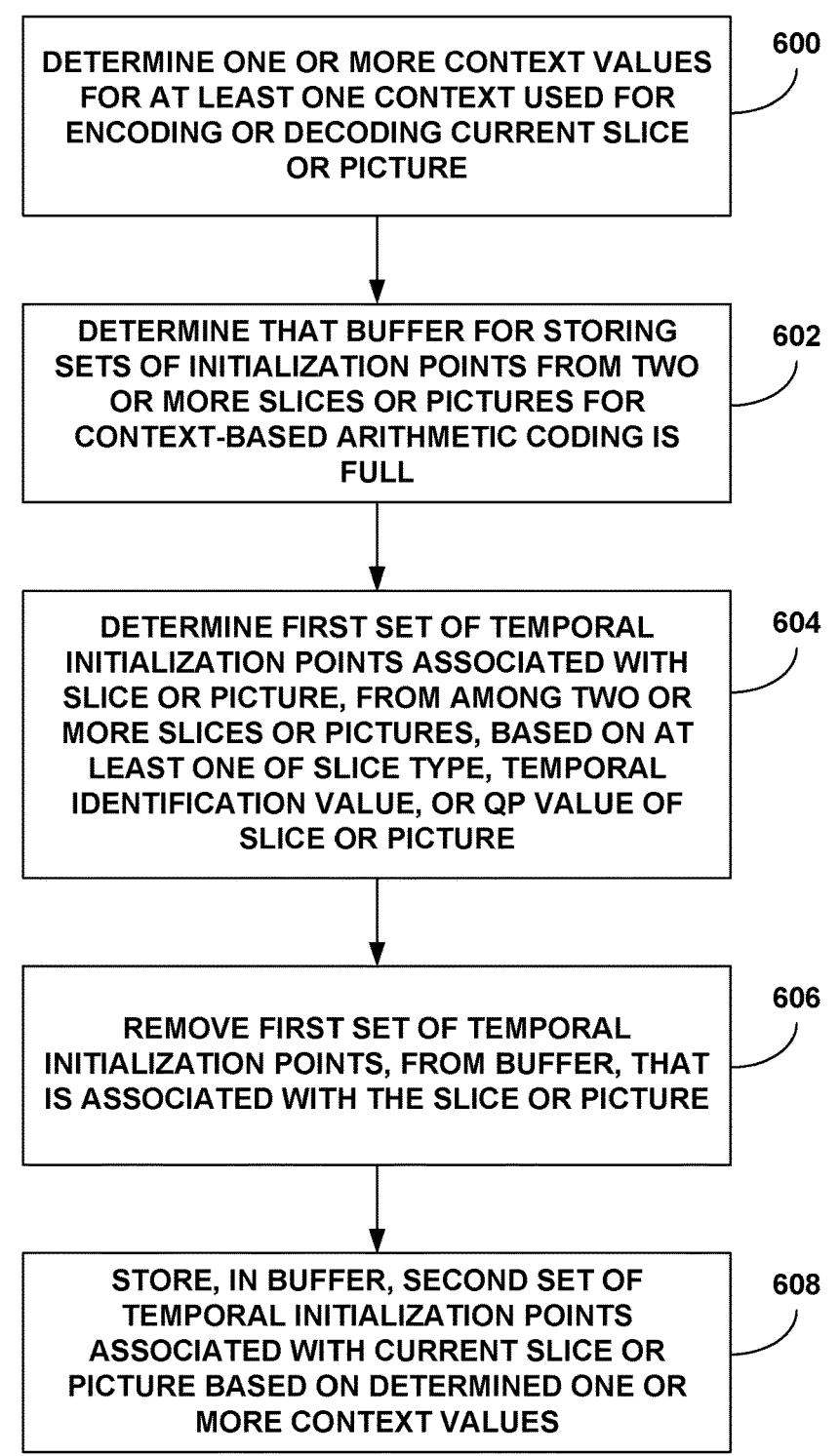

DETERMINE ONE OR MORE CONTEXT VALUES FOR AT LEAST ONE CONTEXT USED FOR ENCODING OR DECODING CURRENT SLICE OR PICTURE  ⟶ 600

DETERMINE THAT BUFFER FOR STORING SETS OF INITIALIZATION POINTS FROM TWO OR MORE SLICES OR PICTURES FOR CONTEXT-BASED ARITHMETIC CODING IS FULL  ⟶ 602

DETERMINE FIRST SET OF TEMPORAL INITIALIZATION POINTS ASSOCIATED WITH SLICE OR PICTURE, FROM AMONG TWO OR MORE SLICES OR PICTURES, BASED ON AT LEAST ONE OF SLICE TYPE, TEMPORAL IDENTIFICATION VALUE, OR QP VALUE OF SLICE OR PICTURE  ⟶ 604

REMOVE FIRST SET OF TEMPORAL INITIALIZATION POINTS, FROM BUFFER, THAT IS ASSOCIATED WITH THE SLICE OR PICTURE  ⟶ 606

STORE, IN BUFFER, SECOND SET OF TEMPORAL INITIALIZATION POINTS ASSOCIATED WITH CURRENT SLICE OR PICTURE BASED ON DETERMINED ONE OR MORE CONTEXT VALUES  ⟶ 608

FIG. 6

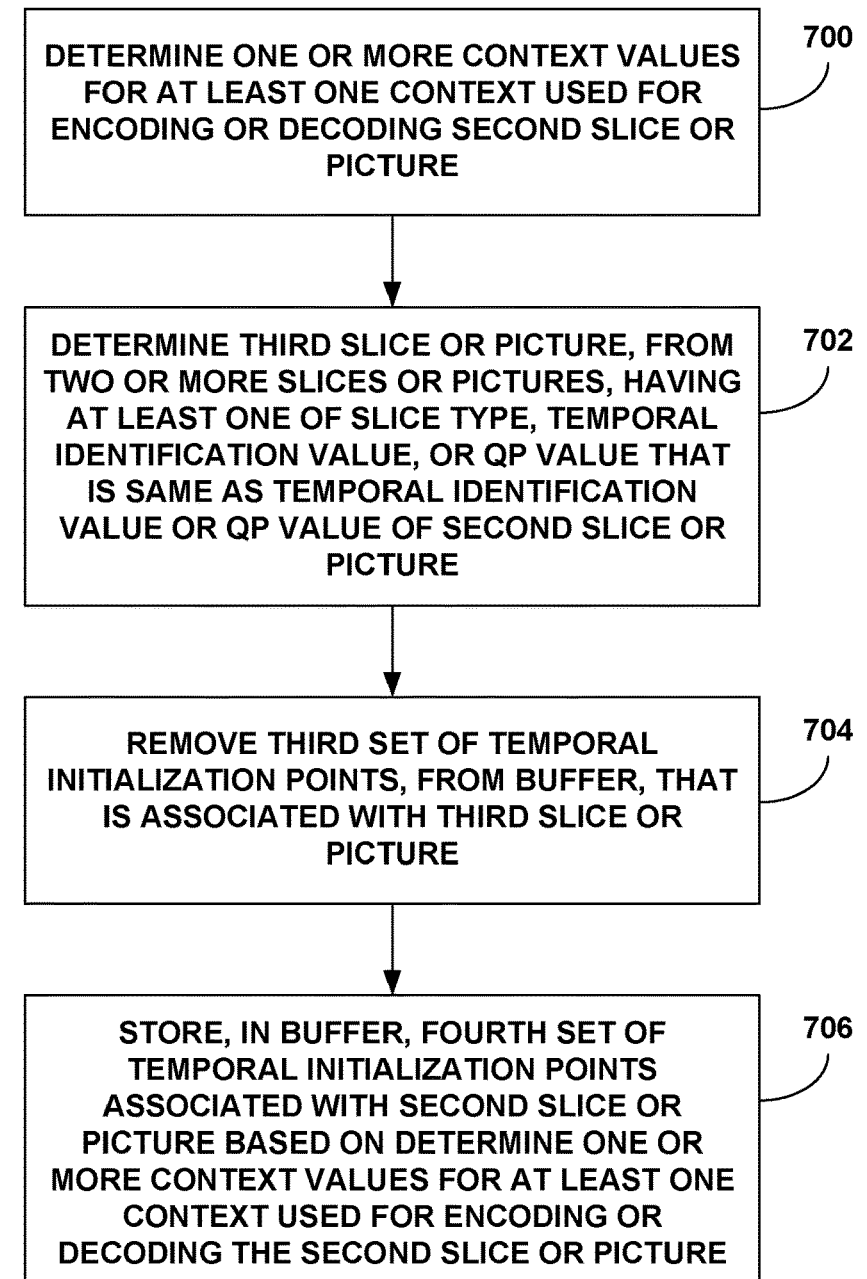

DETERMINE ONE OR MORE CONTEXT VALUES FOR AT LEAST ONE CONTEXT USED FOR ENCODING OR DECODING SECOND SLICE OR PICTURE — 700

DETERMINE THIRD SLICE OR PICTURE, FROM TWO OR MORE SLICES OR PICTURES, HAVING AT LEAST ONE OF SLICE TYPE, TEMPORAL IDENTIFICATION VALUE, OR QP VALUE THAT IS SAME AS TEMPORAL IDENTIFICATION VALUE OR QP VALUE OF SECOND SLICE OR PICTURE — 702

REMOVE THIRD SET OF TEMPORAL INITIALIZATION POINTS, FROM BUFFER, THAT IS ASSOCIATED WITH THIRD SLICE OR PICTURE — 704

STORE, IN BUFFER, FOURTH SET OF TEMPORAL INITIALIZATION POINTS ASSOCIATED WITH SECOND SLICE OR PICTURE BASED ON DETERMINE ONE OR MORE CONTEXT VALUES FOR AT LEAST ONE CONTEXT USED FOR ENCODING OR DECODING THE SECOND SLICE OR PICTURE — 706

FIG. 7

TEMPORAL INITIALIZATION POINTS FOR CONTEXT-BASED ARITHMETIC CODING

This application claims the benefit of U.S. Provisional Application No. 63/268,844, filed Mar. 3, 2022, and U.S. Provisional Application No. 63/362,118, filed Mar. 29, 2022, the entire contents of each of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for determining initialization points for one or more contexts used in context-based arithmetic coding, such as context-adaptive binary arithmetic coding (CABAC). The initialization points may be considered as a starting point for one or more contexts, and may include one or more context states, window or rate adaptation parameters and other parameters used in the arithmetic coding operation.

In some examples, initialization points for the one or more contexts for video data in a current slice or current picture may be based on initialization points for the one or more contexts for video data in a previous picture. Such initialization points are referred to as temporal initialization points.

This disclosure describes example techniques for determining temporal initialization points for a current slice or picture. In some examples, a video coder (e.g., video encoder or video decoder) may utilize temporal identification (ID) values and/or quantization parameter (QP) values to determine the temporal initialization point. In some examples, the video coder may determine the initialization point for a current slice based on initialization point of a previous slice that is located in a corresponding location.

Due to the memory size limitations, there may be a limit to how many temporal initialization points can be stored. When a new set of temporal initialization points is to be stored, one an already stored set of temporal initialization points may be removed. This disclosure describes example techniques of memory management for insertion and removal of temporal initialization points based on temporal identification values and/or QP values that balances memory size limitations, while ensuring that temporal initialization points that result in timely decoding remain in the buffer.

In one example, the disclosure describes a method of processing video data, the method comprising: determining one or more context values for at least one context used for encoding or decoding a current slice or picture; determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; determining a first set of temporal initialization points associated with a slice or picture, from among the two or more slices or pictures, based on at least one of a slice type, a temporal identification value, or a quantization parameter (QP) value of the slice or picture; removing the first set of temporal initialization points, from the buffer, that is associated with the slice or picture; and storing, in the buffer, a second set of temporal initialization points associated with the current slice or picture, wherein the second set of temporal initialization points are based on the determined one or more context values.

In one example, the disclosure describes a device for processing video data, the device comprising: a buffer configured to store sets of temporal initialization points from two or more slices or pictures for context-based arithmetic coding; and processing circuitry coupled to the buffer, the processing circuitry configured to: determine one or more context values for at least one context used for encoding or decoding a current slice or picture; determine that the buffer for storing sets of temporal initialization points from two or more slices or pictures for context-based arithmetic coding is full, wherein each set of temporal initialization points is associated with a slice or picture of the two or more slices or pictures and includes one or more temporal initialization points; determine a first set of temporal initialization points associated with a slice or picture, from among the two or more slices or pictures, based on at least one of a slice type, a temporal identification value, or a quantization parameter (QP) value of the slice or picture; remove the first set of temporal initialization points, from the buffer, that is associated with the slice or picture; and store, in the buffer, a second set of temporal initialization points associated with the current slice or picture, wherein the second set of temporal initialization points are based on the determined one or more context values.

In one example, the disclosure describes a computer-readable storage medium storing instructions thereon that when executed cause one or more processors to: determine one or more context values for at least one context used for encoding or decoding a current slice or picture; determine that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; determine a first set of temporal initialization points associated with a slice or picture, from among the two or more slices or pictures, based on at least one of a slice type, a temporal identification value, or quantization parameter (QP) value of the slice or picture; remove the first set of temporal initialization points, from the buffer, that is associated with the slice or picture; and store, in the buffer, a second set of temporal initialization points associated with the current slice or picture, wherein the second set of temporal initialization points are based on the determined one or more context values.

In one example, the disclosure describes a device for processing video data, the device comprising: means for determining one or more context values for at least one context used for encoding or decoding a current slice or picture; means for determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; means for determining a first set of temporal initialization points associated with a slice or picture, from among the two or more slices or pictures, based on at least one of slice type, a temporal identification value, or a quantization parameter (QP) value of the slice or picture; means for removing the first set of temporal initialization points, from the buffer, that is associated with the slice or picture; and means for storing, in the buffer, a second set of temporal initialization points associated with the current slice or picture, wherein the second set of temporal initialization points are based on the determined one or more context values.

The details of one or more examples are set forth in the accompanying drawings and the description below. Other features, objects, and advantages will be apparent from the description, drawings, and claims.

BRIEF DESCRIPTION OF DRAWINGS

FIG. 6 is a flowchart illustrating an example method of processing video data.

FIG. 7 is a flowchart illustrating another example method of processing video data.

DETAILED DESCRIPTION

Figure 1:
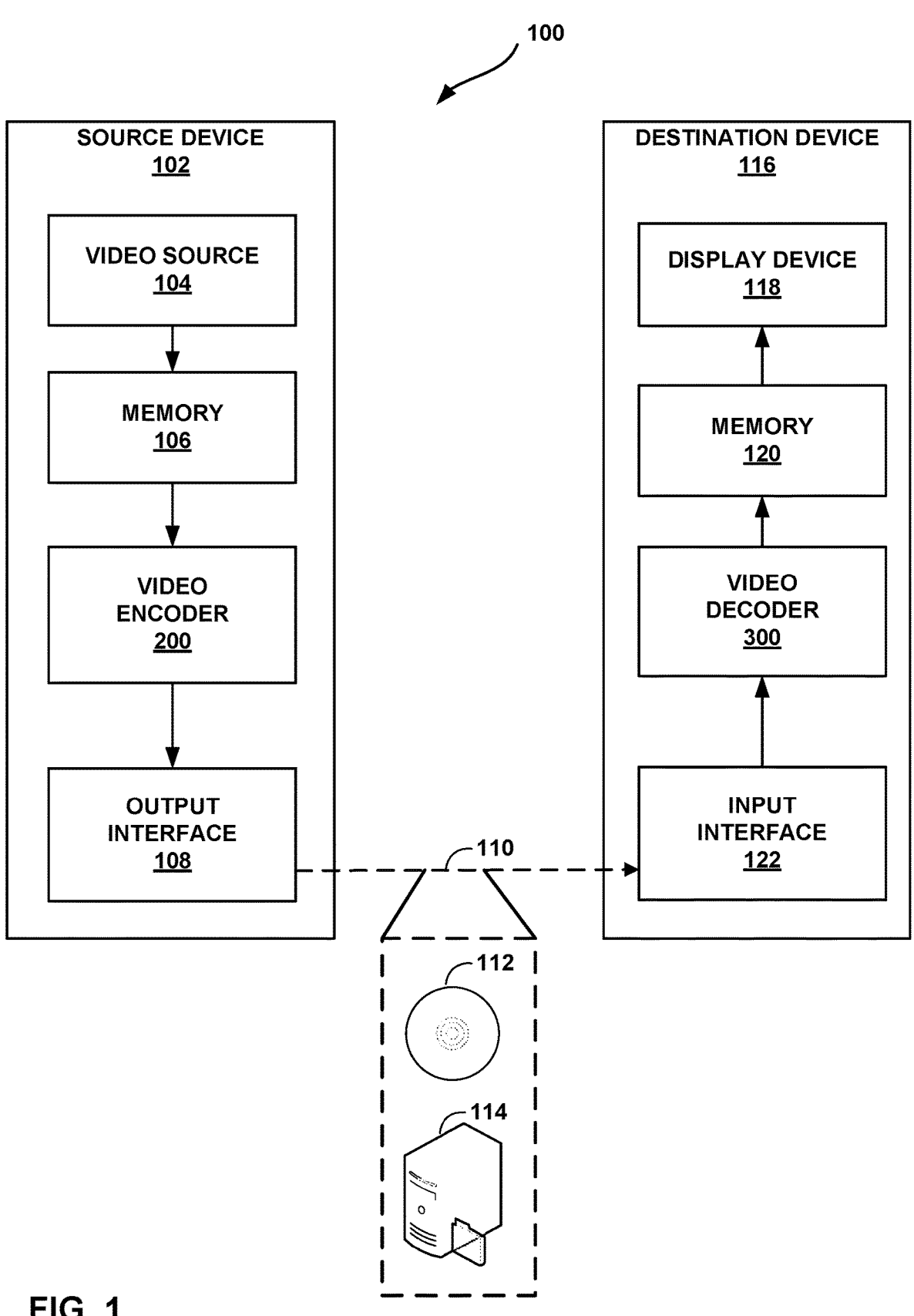
FIG. 1 is a block diagram illustrating an example video encoding and decoding system that may perform the techniques of this disclosure.

In video coding, such as context-based arithmetic coding, a video coder (e.g., video encoder or video decoder) utilizes initialization points for initialization of a current picture or slice. For instance, for context-based arithmetic coding, including context-adaptive binary arithmetic coding (CA-BAC), an initialization point may be used for each context. The initialization point may include one or more context states, window or rate adaptation parameters and other parameters required for the arithmetic coding operation.

The initialization points may be predefined. However, in some examples, in addition to or instead of using predefined initialization points, the video coder may utilize temporal initialization points. A temporal initialization point may refer to an initialization point for a previous picture in coding order that is utilized for determining (e.g., selecting) an initialization point for the current picture. For example, a temporal initialization point may be one or more context values, or derived based on the one or more context values, for at least one context used for encoding or decoding a current picture, that is then used to initialize context values for at least one context of a subsequent picture.

There may be certain issues with using temporal initialization points. For instance, a buffer that stores the temporal initialization points may have a limited size, and the video coder may remove a set of temporal initialization points (e.g., one or more temporal initialization points) to allow for another set of temporal initialization points to be stored. This disclosure describes example techniques for determining which set of temporal initialization points to remove in a way that ensures that the sets of temporal initialization points that remain promote efficient encoding and decoding.

In one or more examples, a video coder stores, in a buffer, respective sets of temporal initialization points for a slice or picture (e.g., after coding that slice or picture). A set of temporal initialization points may include one or more initialization points, which as described above, may be context values for a context or derived from context values for the context used for coding a current slice or picture.

For example, the video coder stores, in the buffer, a first set of temporal initialization points associated with a first slice or picture (e.g., after coding the first slice or picture), stores, in the buffer, a second set of temporal initialization points associated with a second slice or picture (e.g., after coding the second slice or picture), and so forth. In this way, the buffer stores sets of temporal initialization points from two or more slices or pictures for context-based arithmetic coding. Each set of temporal initialization points is associated with a slice or picture of the two or more slices or pictures.

Each slice or picture may have a temporal identification (ID) value and/or a quantization parameter (QP) value. Each slice may also be associated with a slice type. The temporal ID value of a previous picture may indicate whether that previous picture can be used for inter-prediction of a current picture. For instance, only pictures having the same or lower temporal ID value of the current picture can be used for inter-prediction of the current picture. In this way, based on bandwidth availability or processing capabilities, pictures having higher temporal ID values than some threshold can be dropped from the bitstream or not decoded without impacting the ability to decode pictures having temporal ID values less than the threshold. The QP value is indicative of an amount of quantization that is applied in the encoding process.

In one or more examples, if the buffer that stores sets of temporal initialization points from two or more slices or pictures for context-based arithmetic coding is full, the video coder may determine (e.g., identify) a first set of temporal initialization points, from the buffer, associated with a slice or picture, from among the two or more slices or pictures, based on at least one of a slice type, a temporal identification value or quantization parameter (QP) value of the slice or picture. As an example, the video coder may determine (e.g., identify) a first set of temporal initialization points, from the buffer, associated with a slice or picture having at least one of a smallest temporal identification value or quantization parameter (QP) value from among the two or more slices or pictures.

In some examples, the first set of temporal initialization points may be associated with a slice having a slice type that is different than a slice type of a current slice that is encoded or to be decoded. In some examples, multiple sets of temporal initialization points may be stored for a slice type. In such examples, the video coder may determine a grouping of sets of temporal initialization points associated with slices having the same slice type as the current slice. The video coder may determine the first set of temporal initialization points (e.g., those associated with slice or picture having the smallest temporal identification value or QP value) from the grouping of the sets of temporal initialization points associated with slices having the same slice type as the current slice.

The video coder may remove the first set of temporal initialization points, from the buffer, that is associated with the slice or picture. The video coder may store, in the buffer, a second set of temporal initialization points associated with the current slice or picture based on the determined one or more context values of the current slice or picture.

In one or more examples, the video coder may determine (e.g., select) a set of temporal initialization points stored in the buffer, and initialize one or more context values for at least one context used for encoding or decoding a subsequent slice or picture based on the determined set of temporal initialization points. To determine the set of temporal initialization points, the video coder may determine the slice or picture having a temporal identification value and/or QP value that is closest to the temporal identification value and/or QP value of the subsequent slice or picture, and in some cases, having the same slice type. For instance, if the QP value for the subsequent picture is X, then the video coder may determine which set of temporal initialization points is associated with a picture having a QP value of X or closest to X. The video coder may select the determined set of temporal initialization points. The video coder may context-based arithmetic encode or decode the subsequent slice or picture.

There may be possible coding gains by removing a set of temporal initialization points associated with a slice or picture having smallest temporal identification value or QP value. In one or more examples, pictures having smaller temporal identification values and/or QP values tend to have more transform coefficients (e.g., due to less quantization) as compared to pictures having higher temporal identification values and/or QP values that tend to have fewer transform coefficients. If there are a relatively higher number of transform coefficients (e.g., due to lower QP value), then the context values for contexts can be updated relatively quickly and used for the remainder of a slice (e.g., contexts can be adapted in the beginning of slice coding and the rest of the slice will be efficiently coded).

However, if there are a relatively lower number of transform coefficients (e.g., due to higher QP value), then context values for context are updated relatively slowly. That is, the slice with higher QP value has fewer transform coefficients and context adaptation will be slower, so fewer blocks of the slice will be efficiently coded.

In one or more examples, the sets of temporal initialization points stored in the buffer may be closer (e.g., after some mapping or scaling) to the context values that are to be used for coding a subsequent slice or picture. Therefore, if the sets of temporal initialization points stored in the buffer are associated with pictures having higher temporal identification values or QP values, then there is a better likelihood that these sets of temporal initialization points will be useable for subsequent pictures having higher temporal identification values or QP values. Stated another way, in some examples, higher coding efficiency gains may be realized for slices or pictures having higher temporal identification values or QP values using temporal initialization points. Accordingly, by storing temporal initialization points for pictures having higher temporal identification values or QP values, and removing temporal initialization points for pictures having lower temporal identification values or QP values due to buffer size limit, the example techniques may promote coding efficiencies without requiring large sized buffers.

There may be additional issues using temporal initialization points. As described above, each picture may be associated with a temporal identification (ID) value. However, if temporal initialization point of a picture having a higher temporal ID value is to be used for determining the initialization point for a current picture, there may be errors because the temporal initialization point of the picture having the higher temporal ID value may not be available.

As described in more detail, this disclosure describes example techniques in which the temporal ID value for a picture is used to determine whether the temporal initialization points for that picture can be utilized by subsequent pictures. In this manner, there is a reduction in the possibility of a video decoder relying upon temporal initialization points that are not available.

In some examples, the temporal initialization points for a picture may be different on a slice-by-slice basis. In such cases, it may be possible that temporal initialization point for one slice of a current picture overwrites a temporal initialization point of a slice of the previous picture, when the temporal initialization point of the slice of previous picture is to be available. This disclosure describes example techniques to minimize the negative impact of overwriting temporal initialization point information, and ensuring that the correct temporal initialization point is stored.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for temporal initialization points for one or more contexts used in context-based arithmetic coding of the video data of a current picture or slice. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for one or more contexts used in context-based arithmetic coding of the video data of a current picture or slice. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream.

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format.

In general, video encoder 200 and video decoder 300 may be configured to perform the techniques of this disclosure in conjunction with any video coding techniques that use temporal initialization points for one or more contexts used in context-based arithmetic coding of the video data of a current picture or slice. For instance, the plurality of temporal initialization points are included in video data of one or more previous slices or pictures that precede the current slice or picture in coding order.

The temporal initialization points may be associated with a slice or picture. Therefore, there may be a plurality of sets of temporal initialization points for each slice or picture. For instance, a first set of temporal initialization points may be associated with a first slice or picture, a second set of temporal initialization points may be associated with a second slice or picture, and so forth.

Each set of temporal initialization points may be the context values for at least one context of a slice or picture, or may be values derived from the context values for the at least one context of the slice or picture. Video encoder 200 and video decoder 300 may, if temporal initialization is enabled for context-based arithmetic coding, use a stored set of temporal initialization points (e.g., for a previously encoded or decoded slice or picture) to initialize context values for the at least one context for encoding or decoding a subsequent slice or picture. Video encoder 200 and video decoder 300 may update the context values, after the initialization using a set of initialization points, as video encoder 200 and video decoder 300 encode or decode blocks of the subsequent slice or picture.

As described in more detail, in one or more examples, a buffer stores the sets of temporal initialization points. However, the number of possible sets of temporal initialization points may be relatively large, and there may be a size limit to the buffer. Therefore, video encoder 200 and video decoder 300 may be configured to perform buffer management, in which video encoder 200 and video decoder 300 selectively determine which set of initialization points to remove to make memory space for a new set of initialization points to be inserted into the buffer.

This disclosure describes example techniques for such buffer management. For example, if the buffer is full, video encoder 200 and video decoder 300 may evaluate temporal identification (ID) values and/or QP values of slices or pictures, possibly along with slice type, with associated temporal initialization points that are stored in the buffer. For instance, in addition to storing the sets temporal initialization points, the buffer may store information indicative of the temporal ID value and/or QP value of the slice or picture, and possibly the slice type (e.g., I-slice, B-slice, P-slice) associated with each set of the temporal initialization points.

Video encoder 200 and video decoder 300 may compare the temporal ID values and/or QP values of the slices or pictures associated with the sets of temporal initialization points stored in the buffer. Based on the comparison, video encoder 200 and video decoder 300 may determine a set of temporal initialization points associated with a slice or picture based on a temporal ID value or QP value of the slice or picture. For instance, video encoder 200 and video decoder 300 may determine a set of temporal initialization points associated with a slice or picture having at least one of a smallest temporal ID value or QP value. Video encoder 200 and video decoder 300 may remove the first set of temporal initialization points to make memory space for a second set of temporal initialization points associated with a current slice or picture (e.g., a just encoded or decoded slice or picture). The second set of temporal initialization points may be based on the one or more context values determined for the current slice or picture.

In one or more examples, video encoder 200 and video decoder 300 may determine the set of temporal initialization points that is to be removed also based on the slice type. In some examples, if the buffer stores a set of temporal initialization points associated with a slice having the same slice type as the current slice, video encoder 200 and video decoder 300 may remove that set of temporal initialization points. In some cases, video encoder 200 and video decoder 300 may remove that set of temporal initialization points even if there are sets of temporal initialization points associated with slices or pictures having a lower temporal identification value and/or QP value.

For example, to remove a set of temporal initialization points, video encoder 200 and video decoder 300 may first determine whether there is a set of temporal initialization points associated with a slice having a slice type that is the same as the slice type of the current slice. If yes, video encoder 200 and video decoder 300 may remove that set of temporal initialization points. If no, video encoder 200 and video decoder 300 may add the set of temporal initialization points of the current slice to the buffer, assuming that the buffer is not full. In the above example, video encoder 200 and video decoder 300 prioritized slice type, but the example techniques are not so limited. In some examples, to remove a set of temporal initialization points, video encoder 200 and video decoder 300 may first determine whether there is a set of temporal initialization points associated with a slice having temporal identification value or QP value that is the same as the temporal identification value or QP value of the current slice, regardless of the slice type. If yes, video encoder 200 and video decoder 300 may remove that set of temporal initialization points.

However, in instances where the buffer is full, and a set of temporal initialization points is to be removed, video encoder 200 and video decoder 300 may perform the example techniques described in this disclosure such as determining a set of temporal initialization points associated with a slice or picture having at least one of a smallest temporal ID value or QP value, and then removing that set of temporal initialization points.

As also described in more detail, video encoder 200 and video decoder 300 may determine (e.g., select) at least one set of temporal initialization points of the plurality of sets of temporal initialization points based on the respective temporal identification (ID) values and/or quantization parameter (QP) values of the slices or picture associated with the plurality of sets temporal initialization points and a temporal ID value or QP value of the current picture or slice. In this manner, there may be reduction in possibility of not having temporal initialization points that are to be available for the current picture, such as when pictures having higher temporal ID values than that of the current picture are removed from the bitstream or not processed.

Video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs may not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may determine an intra-prediction mode to generate the prediction block. Some examples of VVC provide sixty-seven intra-prediction modes, including various directional modes, as well as planar mode and DC mode. In general, video encoder 200 determines an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign one or more context values to a context within a context model to a symbol to be transmitted. The context values may relate to, for example, whether neighboring values of the symbol are zero-valued or not. The probability determination (e.g., context value) may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In JVET-Y0181: "AHG12: CABAC initialization from previous inter slice," Seregin et al., Joint Video Experts Team (JVET) of ITU-T SG 16 WP 3 and ISO/IEC JTC 1/SC 29, 25$^{th}$ meeting by teleconference, 12-21 Jan. 2022, a method using previously encoding/decoding order CABAC (context-adaptive binary arithmetic coding) initialization points for CABAC initialization of the current picture or slice is described. Although described with respect to CABAC, the example techniques are applicable to context-based arithmetic coding. For instance, CABAC arithmetic coding may require a starting point for every context, and the starting point is called an initialization point. This starting point (e.g., initialization point) may include one or more context states, window or rate adaptation parameters and other parameters required for the arithmetic coding operation. For instance, there may be one or more initialization points for one or more context values of a context, and the one or more initialization points may be values (e.g., initial values) for the one or more context values.

In a video codec, typically those initialization points are predefined and are known to both video encoder 200 and video decoder 300, for example in HEVC and VVC, the initialization points are defined in initialization tables for each slice type, I-, P-, and B-slices.

In temporal CABAC initialization, in addition to or instead of using predefined initialization points, initialization points can be stored at a certain CTUs of a picture or slice and those stored initialization points can be used to initialize the next pictures or slices instead of or in addition to the predefined initialization points. That is, in some examples, temporal initialization points are included in video data of one or more previous slices or pictures that precede the current slice or picture in coding order, and may be for one or more contexts used in context-based arithmetic coding of the video data of a current slice or picture.

The CTUs at which video encoder 200 or video decoder 300 may store the initialization point(s) may vary and information indication the CTUs can be signaled. As an example, video encoder 200 and video decoder 300 may store the initialization point for a slice in the middle of the picture. That is, as video encoder 200 is encoding or video decoder 300 is decoding the slice, when video encoder 200 encodes or video decoder 300 decodes a CTU in a middle of a slice, video encoder 200 or video decoder 300 may store the current one or more context values of a context as initialization points that are used to encode or decode syntax elements in a subsequent slice or picture. For instance, when video encoder 200 or video decoder 300 begin to encode or decode the subsequent slice or picture, video encoder 200 or video decoder 300 may set the initial values for the context values of the context equal to or based on (e.g., with mapping, scaling, weighting, etc.) the stored initialization points. Then, as video encoder 200 and video decoder 300 are encoding or decoding the subsequent slice or picture, video encoder 200 and video decoder 300 may update the context values from the initial values based on more recently encoded or decoded video data.

In some examples, video encoder 200 and video decoder 300 may store initialization points after coding CABAC states, windows, and other parameters of a certain CTU. For example, storing means to store after, for a certain CTU, coding CABAC states, windows, and other parameters for the initialization. For instance, the parameters that are adapted to a coded content in a previous picture may be better at representing the starting initialization point for video data of a current picture than the predefined initialization point.

The storing may be done separately for each slice type and slice quantization parameter (QP). In some examples, the initialization with the same slice type and the same QP as the current slice can be used for the current slice CABAC initialization.

There may be certain issues with temporal initialization points for context-based arithmetic coding. For example, since slices of the current picture may be independently decoded, and pictures with temporal identification (ID) values higher than a threshold can be removed as part of temporal scalability, techniques that utilize temporal initialization points may be refined to allow temporal scalability while ensuring that useable temporal initialization points are available.

In some examples, multiple initialization points may be stored from previous pictures in coding order, for example in FIFO buffer where the top initialization point is from the previous picture closest to the current picture. As an example, a buffer may store a first set of initialization points for one or more context values of a context for a first slice or picture, store a second set of initialization points for one or more context values of the context for a second slice or picture, and so forth.

An index can be introduced to indicate which initialization point is used from the FIFO buffer, and such initialization index is signaled in a bitstream, for example in picture or slice header. For example, video encoder 200 may signal and video decoder 300 may receive an index into the buffer that indicates which set of initialization points to use for initializing one or more context values of a context of a slice or picture that is currently being decoded. Video decoder 300 may retrieve a set of initialization points based on the index, and initialize one or more context values of a context.

For instance, video decoder 300 may set the initial values of the one or more context values equal to the retrieved set of initialization points. As another example, video decoder 300 may map, scale, weight, or perform some other operation, the retrieved set of initialization points to determine the initial values of the one or more context values.

The following describes temporal scalability, and use of temporal initialization points for temporal scalability. Every coded picture may have a temporal ID value assigned by video encoder 200. Video encoder 200 may signal the temporal ID value in a network abstraction layer unit (NALU) header. The temporal ID value is used for temporal scalability, where certain picture can be ignored (e.g., removed from the bitstream or not processed), and other pictures can be decoded without pictures that are removed or not processed.

In one example, temporal scalability can be achieved by setting a restriction that pictures having lower temporal ID value cannot use pictures having higher temporal ID values for inter-prediction. In this case, video decoder 300 may be able to decode pictures having lower temporal ID values without using pictures having higher temporal ID values because the pictures having higher temporal ID values cannot be used for inter-prediction of pictures having lower temporal ID values. Accordingly, pictures having higher temporal ID values can be removed from a bitstream or not processed (e.g., ignored). When temporal initialization for context-based arithmetic coding is applied, video encoder 200 and video decoder 300 may utilize the temporal ID value to identify the available stored initialization points for the current slice/picture initialization.

In one or more examples, video encoder 200 and video decoder 30 may store temporal ID value with an initialization point. For example, each set of initialization points, where a set includes one or more initialization points, may be associated with a slice or picture. Video encoder 200 and video decoder 300 may store the set of initialization points and information indicative of the temporal ID value of the slice or picture associated with the set of initialization points. As an example, a first set of initialization points may be associated with a first slice or picture having a first temporal ID value, and a second set of initialization points may be associated with a second slice or picture having a second temporal ID value. Video encoder 200 and video decoder 300 may store the first set of initialization points and the first temporal ID value, and information that the first temporal ID value is for the first slice or picture that is associated with the first set of initialization points (e.g., associate the first temporal ID value and the first set of initialization points). Video encoder 200 and video decoder 300 may store the second set of initialization points and the second temporal ID value, and information that the second temporal ID value is for the second slice or picture that is associated with the second set of initialization points (e.g., associate the second temporal ID value and the second set of initialization points).

To determine (e.g., select) an initialization point based on the temporal ID value of the stored sets of initialization points, video encoder 200 and video decoder 300 may compare the temporal ID value against the current slice/picture temporal ID. For example, video encoder 200 and video decoder 300 may select at least one set of temporal initialization points of the plurality of sets of temporal initialization points based on the respective temporal ID values associated with the plurality of sets of temporal initialization points and a temporal ID value of the current picture or slice.

The sets of initialization points having a temporal ID equal or smaller than the current temporal ID are selected as available ones. For example, to determine the at least one set of temporal initialization points, video encoder 200 and video decoder 300 may determine a group of temporal initialization points of the plurality of sets of temporal initialization points, where the respective temporal ID values for the group of temporal initialization points is less than or equal to the temporal ID value of the current picture or slice. Video encoder 200 and video decoder 300 may select the set of temporal initialization points from the group of temporal initialization points.

In one example, only sets of initialization points having the same temporal ID as the current slice/picture temporal ID are selected as available initialization points. For instance, as smaller temporal ID typically have lower QP, initialization points from previous pictures having lower temporal ID values may not properly represent the initialization point for a slice of a current picture. In some examples, to determine the at least one set of temporal initialization point, video encoder 200 and video decoder 300 may determine a group of temporal initialization points of the plurality of sets temporal initialization points, where the respective temporal ID values for temporal initialization points in the group of temporal initialization points is equal to the temporal ID value of the current picture or slice. Video encoder 200 and video decoder 300 may select the at least one set of temporal initialization point from the group of temporal initialization points.

In another example, the initialization point with the same temporal ID is searched, if such an initialization point is not available then smaller temporal ID is checked, for example the current temporal ID value minus 1, if it is not available then the current temporal ID value minus 2 is checked, and so on. The found set of initialization points is used for the initialization.

For example, to determine the at least one set of temporal initialization points, video encoder 200 and video decoder 300 may determine that no temporal initialization point in the plurality of sets of temporal initialization points has a temporal ID value that is equal to the temporal ID value of the current picture or slice. Based on a determination that no temporal initialization point in the plurality of sets of temporal initialization points has a temporal ID value that is equal to the temporal ID value of the current picture or slice, video encoder 200 and video decoder 300 may determine whether any temporal initialization point in the plurality of sets of temporal initialization points has a temporal ID value that is one less than the temporal ID value of the current picture or slice. Based on the determination that there are one or more temporal initialization points having a temporal ID value that is one less than the temporal ID value of the current picture or slice, video encoder 200 and video decoder 300 may select the at least one set of temporal initialization points from the one or more sets of temporal initialization points having the temporal ID value that is one less than the temporal ID value of the current picture or slice.

Similarly, instead of the using the same QP initialization, when it is not available the QP−1 or QP+1 is searched and used if stored, if not available QP−2 or QP+2 is checked on so on. The found one is used for the initialization. Temporal ID and QP search can be combined when the same temporal ID and QP initialization point is not available.

For instance, in one or more examples, video encoder 200 and video decoder 30 may store QP value with an initialization point. For example, each set of initialization points, where a set includes one or more initialization points, may be associated with a slice or picture. Video encoder 200 and video decoder 300 may store the set of initialization points and information indicative of the QP value of the slice or picture associated with the set of initialization points. As an example, a first set of initialization points may be associated with a first slice or picture having a first QP value, and a second set of initialization points may be associated with a second slice or picture having a second QP value. Video encoder 200 and video decoder 300 may store the first set of initialization points and the first QP value, and information that the first QP value is for the first slice or picture that is associated with the first set of initialization points (e.g., associate the first QP value and the first set of initialization points). Video encoder 200 and video decoder 300 may store the second set of initialization points and the second QP value, and information that the second QP value is for the second slice or picture that is associated with the second set of initialization points (e.g., associate the second QP value and the second set of initialization points).

In one example, only sets of initialization points having the same QP value as the current slice/picture QP value are selected as available initialization points. In some examples, to determine the at least one set of temporal initialization point, video encoder 200 and video decoder 300 may determine a group of temporal initialization points of the plurality of sets temporal initialization points, where the respective QP values for temporal initialization points in the group of temporal initialization points is equal to the QP value of the current picture or slice. Video encoder 200 and video decoder 300 may select the at least one set of temporal initialization point from the group of temporal initialization points.

In another example, the initialization point with the same QP value is searched, if such an initialization point is not available then closest QP value is checked, for example the current QP value plus or minus 1, if it is not available then the current QP value plus or minus 2 is checked, and so on. The found set of initialization points is used for the initialization.

For example, to determine the at least one set of temporal initialization points, video encoder 200 and video decoder 300 may determine that no temporal initialization point in the plurality of sets of temporal initialization points has a QP value that is equal to the QP value of the current picture or slice. Based on a determination that no temporal initialization point in the plurality of sets of temporal initialization points has a QP value that is equal to the QP value of the current picture or slice, video encoder 200 and video decoder 300 may determine whether any temporal initialization point in the plurality of sets of temporal initialization points has a QP value that is one less than or one more than the QP value of the current picture or slice. Based on the determination that there are one or more temporal initialization points having a QP value that is one less than or one more than the QP value of the current picture or slice, video encoder 200 and video decoder 300 may select the at least one set of temporal initialization points from the one or more sets of temporal initialization points having the QP value that is one less or one more than the QP value of the current picture or slice.

Accordingly, in one or more examples, video encoder 200 and video decoder 300 may be configured to determine (e.g., select) a set of temporal initialization points stored in the buffer, and initialize one or more context values for at least one context used for encoding or decoding a subsequent slice or picture based on the selected set of temporal initialization points. Video encoder 200 and video decoder

300 may context-based arithmetic encode or decode the subsequent slice or picture. For example, video encoder 200 and video decoder 300 may set the initial values for the context values based on the initialization points, and use the initial values for encoding or decoding one or more syntax values for the subsequent slice or picture. Video encoder 200 and video decoder 300 may update the context values from the initial values.

One example way to select the set of temporal initialization points may include video encoder 200 and video decoder 300 determining a temporal identification value for the subsequent slice or picture. Video encoder 200 and video decoder 300 may determine that none of two or more slices or pictures having associated sets of temporal initialization points stored in the buffer have a temporal identification value equal to the temporal identification value for the subsequent slice or picture. In this case, video encoder 200 and video decoder 300 may determine a slice or picture from among the two or more slices or pictures having a temporal identification value that is closest to and less than the temporal identification value of the subsequent slice or picture. To select the set of temporal initialization points, video encoder 200 and video decoder 300 may select the set of temporal initialization points associated with the determined slice or picture having the temporal identification value that is closest to and less than the temporal identification value of the subsequent slice or picture.

Another example way to select the set of temporal initialization points may include video encoder 200 and video decoder 300 determining a QP value for the subsequent slice or picture. Video encoder 200 and video decoder 300 may determine that none of two or more slices or pictures having associated sets of temporal initialization points stored in the buffer have a QP value equal to the QP value for the subsequent slice or picture. In this case, video encoder 200 and video decoder 300 may determine a slice or picture from among the two or more slices or pictures having a QP value that is closest to the QP value of the subsequent slice or picture. In this case, the closest QP value may be greater than the QP value for the current slice or picture. To select the set of temporal initialization points, video encoder 200 and video decoder 300 may select the set of initialization points associated with the slice or picture having the QP value that is closest to the QP value of the subsequent slice or picture.

In the above examples, video encoder 200 and video decoder 300 may determine a set of initialization points associated with a slice or picture having a temporal identification value that is closest to the temporal identification value of the subsequent slice or picture without being greater than the temporal identification value of the current slice and/or associated with a slice or picture having the QP value that is closest to the QP value of the subsequent slice or picture. In some examples, video encoder 200 and video decoder 300 may also consider the slice type in determining which set of temporal initialization points to use. For instance, the set of temporal initialization points may be associated with a slice type that is the same as the slice type of the subsequent slice.

The following describes storing of initialization points. As described above, slices of the same picture may be independently decoded (i.e., the next slice of the same picture cannot depend on the previous slice of the same picture). Accordingly, initialization point stored in the previous slices of the same picture cannot be used for any slice of the same picture.

To achieve this, in one example, an initialization point (e.g., a set of initialization points, where the set can include one or more initialization points) is temporally stored in a temporary buffer and is added from the temporary buffer to the storage buffer only after all slices of the same picture are processed (coded, decoded, parsed). In this way, the initialization points in the temporary buffer may be updated until all slices of the same picture are processed, and then the storage buffer receives the initialization points from the temporary buffer.

When the initialization point is added, the previous stored initialization point may be removed/replaced as the buffer has a limit, and if there is an update while the slices of the same pictures are being processed, the suitable initialization point of the previous picture may be replaced by the previous slice of the same picture. That is, if a temporary buffer is not utilized, there is a possibility that the initialization points in the storage buffer that should be kept are overwritten. By utilizing the temporary buffer, it may be possible to avoid overwriting initialization points in the storage buffer that should be kept, and overwrite the storage buffer, with initialization points in the temporary buffer, only after the slices of the same pictures are processed.

Therefore, there may be benefits to store the initialization point separately in a temporary buffer and update the storage buffer with the temporary buffer only after all slices of a picture are processed. To check the end of picture, a CTU address can be checked whether it is equal to the last CTU or slice index whether it is the last slice of the picture.

For example, video encoder 200 and video decoder 300 may store, in a first buffer, one or more temporal initialization points for one or more contexts used in context-based arithmetic coding of the video data of one or more previous pictures. Video encoder 200 and video decoder 300 may store, in a second buffer, a temporal initialization point (e.g., a set of temporal initialization points) for one or more contexts used in context-based arithmetic coding of the video data of a slice of a current picture, where storing, in the second buffer, includes storing, in the second buffer, during a coding of the video data of the current picture. Video encoder 200 and video decoder 300 may, subsequent to processing a last coding tree unit (CTU) or slice of the current picture, store the temporal initialization point stored in the second buffer in the first buffer.

In another example, initialization points can be signaled in adaptation parameter sets (APS), for example similar to adaptive loop filter parameters set carrying filter coefficients. An APS may already have restrictions defined for temporal ID value handling and not using the APS derived from the current picture to be applied to the same picture coding.

In one or more examples, initialization points can be stored at various picture locations, such as center or end of picture. Other locations within the picture may be used as well.

A choice of which storage location is used can be signaled in a bitstream. In one example, video encoder 200 may signal such indication and video decoder 300 may parse such indication in picture or slice headers, or any other parameter set, or elsewhere. Picture header may be an example signaling place as picture header is shared by all slices of a picture, and it may not be necessary to signal the storage choice in each slice to achieve a picture level adaptation.

There may be multiple syntax elements signaled in picture or slice headers for temporal CABAC, such as whether temporal initialization is applied to a picture or slice, storage location signaling, or how to remove entry from the storage initialization buffer, etc. Such syntax elements signaling in picture or slice headers may be conditioned by higher-level indication, for example, by the syntax signaled in SPS or PPS indicating whether temporal CABAC initialization is used.

The syntax elements signaling in picture or slice headers may be also dependent on whether an initialization entry that can be used for a slice is present in the buffer. If such entry is not present in a buffer, temporal initialization may not be applied, and no syntax elements associated with the temporal initialization may be signaled in slice or picture headers.

The entry identification may be performed by comparing temporal ID and/or QP values for the slice to be coded and the values of the entry in the buffer. That is, in one or more examples, video decoder 300 may compare the temporal identification value and/or QP value of the slice or picture being decoded with the temporal identification values and/or QP values associated with each set of temporal initialization points to select the set of initialization points used to initialize context values of a context used for encoding or decoding a slice or picture.

In some examples, initialization storage may be restricted by a certain number of entries for implementation purpose as storing it (e.g., initialization points, but other information for storage may be possible) for every temporal ID and QP can be expensive, such as requiring a large buffer size. For example, a buffer size may be limited to N per slice type. In such case, when buffer is full, that is, all N entries are added to the buffer, one entry shall be removed before adding the next entry. In one example, the number N may be set equal to 5 as it represents a typical GOP 32 coding.

The entry removal may be done by video encoder 200 and video decoder 300 according to a certain rule based on temporal ID values and/or QP values of buffer entries. For example, the rule may be as follows: the entry with the smallest temporal ID is removed, and/or the entry with the smallest temporal ID and the smallest QP is removed.

In some examples, if there is an entry for a set of temporal initialization points associated with a slice with the same slice type as the subsequent slice, then video encoder 200 and video decoder 300 may remove that entry for the set of temporal initialization points even if there are entries of sets of initialization points associated with a slice or picture having a smaller temporal ID or smaller QP in the buffer. In some examples, the entry with the smallest temporal ID and/or smallest QP may be for a set of temporal initialization points associated with a slice having a slice type that is different than the slice type of the subsequent slice.

In some examples, it may be possible that there are multiple entries for one slice type. For instance, for slice type I-slice, the buffer may store up to 5 sets of temporal initialization points, for slice type P-slice, the buffer may store up to 5 sets of temporal initialization points, and for slice type B-slice, the buffer may store up to 5 sets of temporal initialization points. In such an example, video encoder 200 and video decoder 300 may first determine the sets of temporal initialization points associated with a slice type that is the same as the slice type of a subsequent slice. Then, video encoder 200 and video decoder 300 may determine, within this determined sets of temporal initialization points, a set of temporal initialization points having a smallest temporal identification value and/or QP value, and determine that the set of temporal initialization points having a smallest temporal identification value and/or QP value from within the sets of temporal initialization points having the same slice type as the subsequent slice should be removed.

Removing the entry with the smallest QP may be due to the smallest QP slice having more transform coefficients (less quantization), so contexts can be adapted in the beginning of slice coding and the rest of the slice will be efficiently coded. The slice with higher QP has fewer transform coefficients and context adaptation may be slower, so fewer blocks of the slice will be efficiently coded.

Stated another way, having temporal initialization points allows for initialization of context values that can then be adapted as part of the encoding or decoding. If context values of a slice can be adapted relatively quickly (e.g., slices having lower QP value), then there may be some benefits of having temporal initialization points. However, such benefits may be reduced because the context values of the slice having lower QP value can be adapted relatively quickly even if not properly initialized. For slices whose context values do not adapt relatively quickly (e.g., slices with higher QP values), there may be more benefit of properly initializing the context values.

As an example, assume that context values of a first slice having a lower QP value tends to be adapted quickly, and the context values of a second slice having a higher QP value tends to not adapt quickly. If temporal initialization points for the first slice are available, there may be some benefit in speeding up the adapting of the context values. However, such benefit may not be great because the context values of the first slice tend to adapt quickly even if not properly initialized.

If temporal initialization points for the second slice are available, there may be greater benefit in speeding up the adapting of the context values as compared to the first slice. For instance, by initializing the context values for the second slice, the adaptation of the context values starts from values closer to the final value, and therefore, there is better compression of blocks in the second slice as compared to if temporal initialization points were not available.

As described above, slices having higher QP values tend to be slices whose context values adapt more slowly. Therefore, if temporal initialization points of slices having higher QP values are stored in the buffer, then such temporal initialization points would be available for future slices where the benefits of having temporal initialization points is more present. As a result, keeping the initialization entry with the higher QP may provide efficient coding for the future pictures.

Similarly, lower temporal ID entry may be removed as typically lower temporal ID slices are coded with smaller QP. For instance, similar to above, having temporal initialization points allows for initialization of context values that can then be adapted as part of the encoding or decoding. If context values of a slice can be adapted relatively quickly (e.g., slices having lower temporal identification value), then there may be some benefits of having temporal initialization points. However, such benefits may be reduced because the context values of the slice having lower temporal identification value can be adapted relatively quickly even if not properly initialized. For slices whose context values do not adapt relatively quickly (e.g., slices with higher temporal identification values), there may be more benefit of properly initializing the context values.

As an example, assume that context values of a first slice having a lower temporal identification value tends to be adapted quickly, and the context values of a second slice having a higher temporal identification value tend to not adapt quickly. If temporal initialization points for the first slice are available, there may be some benefit in speeding up the adapting of the context values. However, such benefit may not be great because the context values of the first slice tend to adapt quickly even if not properly initialized.

If temporal initialization points for the second slice are available, there may be greater benefit in speeding up the adapting of the context values as compared to the first slice. For instance, by initializing the context values for the second slice, the adaptation of the context values starts from values closer to the final value, and therefore, there is better compression of blocks in the second slice as compared to if temporal initialization points were not available.

As described above, slices having higher temporal identification values tend to be slices whose context values adapt more slowly. Therefore, if temporal initialization points of slices having higher temporal identification values are stored in the buffer, then such temporal initialization points would be available for future slices where the benefits of having temporal initialization points is more present. As a result, keeping the initialization entry with the higher temporal ID may provide efficient coding for the future pictures.

Other rules based of temporal ID values, QP values or slice type are possible, and this disclosure is not limited to the example rules for temporal ID values and QP values, or slice types. The choice of the rule can be signaled in bitstream in picture or slice headers, or any other parameter set, or elsewhere.

Accordingly, in one or more examples, video encoder 200 and video decoder 300 may be configured to process video data. To process the video data, video encoder 200 and video decoder 300 may be configured to determine one or more context values for at least one context used for encoding or decoding a current slice or picture.

Video encoder 200 and video decoder 300 may determine that a buffer for storing sets of temporal initialization points from two or more slices or pictures for context-based arithmetic coding is full (e.g., there are N entries in the buffer that can store N entries). As described above, each set of temporal initialization points is associated with a slice or picture of the two or more slices or pictures and includes one or more temporal initialization points.

Video encoder 200 and video decoder 300 may determine (e.g., identify) a first set of temporal initialization points associated with a slice or picture, from among the two or more slices or pictures, based on at least one of a slice type, a temporal identification value, or quantization parameter (QP) value of the slice or picture. Video encoder 200 and video decoder 300 may remove the first set of temporal initialization points, from the buffer, that is associated with the slice or picture, and store, in the buffer, a second set of temporal initialization points associated with the current slice or picture. The second set of temporal initialization points may be based on the determined one or more context values (e.g., the second set of temporal initialization points are equal to the one or more context values for the context or generated from the one or more context values for the context).

As one example, to determine the first set of temporal initialization points (e.g., the set of temporal initialization points that is to be removed), video encoder 200 and video decoder 300 may determine the first set of temporal initialization points associated with the slice or picture, from among the two or more slices or pictures, having at least one of a smallest temporal identification value or quantization parameter (QP) value. For instance, video encoder 200 and video decoder 300 may determine the slice or picture having the smallest temporal identification value from among temporal identification values of the two or more slices or pictures, or may determine the slice or picture having the smallest QP value. In some cases, the slice associated with the first set of temporal initialization points may have a slice type that is different than the slice type of the current slice from among QP values of the two or more slices or pictures.

In some examples, if the buffer is full, or possibly even if the buffer is not full, video encoder 200 and video decoder 300 may remove duplicate entries first, before removing a set of initialization points associated with slice or picture having smallest temporal identification value or QP value. For instance, if the buffer is full, or possibly even if the buffer is not full, prior to storing a set of initialization points in the buffer associated with a current slice or picture, video encoder 200 and video decoder 300 may determine whether there are any sets of initialization points in the buffer associated with a slice or picture that has the same temporal identification value or QP value as the current slice or picture, and/or with the same slice type.

If there is a set of initialization points in the buffer associated with the slice or picture that has the same temporal identification value, QP value, or slice type as the current slice or picture, video encoder 200 and video decoder 300 may remove that set of initialization points even if there are other sets of initialization points associated with slice or picture having a lower temporal identification value or QP value. If there is no set of initialization points in the buffer associated with the slice or picture that has the same temporal identification value, QP value, or slice type as the current slice or picture, video encoder 200 and video decoder 300 may remove the set of initialization points having a smallest temporal identification value or QP value.

In some examples, the set of initialization points having a smallest temporal identification value or QP value that is removed may have a different slice type than the current slice. In some examples, such as where multiple sets of temporal initialization points can be stored for a slice type, video encoder 200 and video decoder 300 may determine a grouping of sets of temporal initialization points associated with a slices having the same slice type as the current slice. Video encoder 200 and video decoder 300 may then determine a set of temporal initialization points within this grouping having a smallest temporal identification value or QP value, as the set of temporal initialization points that is to be removed.

Accordingly, video encoder 200 and video decoder 300 may determine that at least one of a temporal identification value or QP value for the current slice or picture is different than a temporal identification value or QP value for each of the two or more slices or pictures having associated sets of temporal initialization points stored in the buffer. In such examples, video encoder 200 and video decoder 300 may remove the first set of temporal initialization points based on the determination that at least one of the temporal identification value or QP value for the current slice or picture is different than the temporal identification value or QP value for each of the two or more slices or pictures. For example, the temporal identification value or QP value of the slice or picture associated with the first set of temporal initialization points is different than the temporal identification value or QP value of the current slice or picture.

For example, assume that the current slice or picture is a first slice or picture. In this example, video encoder 200 and video decoder 300 may determine one or more context values for at least one context used for encoding or decoding a second slice or picture. Video encoder 200 and video decoder 300 may determine a third slice or picture, from the two or more slices or pictures, having at least one of a temporal identification value or QP value that is same as a temporal identification value or QP value of the second slice or picture. In this example, video encoder 200 and video decoder 300 may remove a third set of temporal initialization points, from the buffer, that is associated with the third slice or picture, and store, in the buffer, a fourth set of temporal initialization points associated with the second slice or picture based on the determined one or more context values for at least one context used for encoding or decoding the second slice or picture.

Initialization points may include several parameters such as multiple contexts states and multiple adaptation rates or adaptation windows (to indicate how fast context state can be adapted after each bin coding). Initialization storage buffer may be reduced by storing quantized values of those parameters to reduce the dynamic range for the possible values, which may require fewer bits to store those parameters. In one example, video encoder 200 and video decoder 300 may store a sum of the states and a sum of the adaptation rates. Video encoder 200 and video decoder 300 may assign the states values a sum of the states divided by the number of states (average state). Video encoder 200 and video decoder 300 may assign the adaptation rates (adaptation windows) values a sum of the adaptation rates divided by the number of the adaptation rates (average adaptation rate).

In another example, video encoder 200 and video decoder 300 may only store certain parameters (e.g., only some of the initialization points). In such examples, video encoder 200 and video decoder 300 may initialize the other parameters from the default values. For example, only one state and one adaptation rate are stored. When the initialization is performed, the stored values are assigned to the first state and to the first adaptation rate, respectively, and the second state and the second adaptation rate are assigned from the default initialization values that may be already stored in the codec (e.g., video encoder 200 and video decoder 300), such as initialization points stored per I-, P-, B-slice described above. Other value packing mechanisms applied to the states and adaptation rates values may be applied as well.

The following describes multiple initialization points. Multiple initialization points can be stored per picture. That is, for a picture or slice there may be a set of initialization points, where a set of initialization points includes on initialization point or multiple initialization points. In one example, the multiple initialization points can be used when more than one slice is used in a picture. For example, an initialization point can be stored for each slice.

A slice has a relative position within a picture, so the initialization points are stored from a previous picture corresponding to the current slice position. In one example, an initialization point is stored in the middle of each slice in a previous picture and is used to initialize the corresponding current slice.

The slice boundaries of the current and previous pictures do not have to be aligned. In one example, the location of where to store the initialization point is driven by the current picture slice boundaries.

In another example, initialization point(s) are stored for every slice of the current picture at certain position, and later pictures can decide by a certain rule which initialization to use. Such rules can be, for example, checking the coordinates where initialization was stored and compare to whether such location belongs to the current slice and if yes, then such initialization may be used. In another example, per slice initialization points can be stored in a buffer and index is signaled for the current slice to identify which initialization point to be used.

For example, video encoder 200 and video decoder 300 may store a previous temporal initialization point for one or more contexts used in context-based arithmetic coding of the video data of a previous slice in a previous picture. For a current slice, video encoder 200 and video decoder 300 may determine that the current slice in the current picture has a location in the current picture that corresponds to a location of the previous slice in the previous picture. Based on the current slice having the location in the current picture that corresponds to the location of the previous slice in the previous picture, video encoder 200 and video decoder 300 may determine a current temporal initialization point for the current slice based on the previous temporal initialization point.

Figure 2:
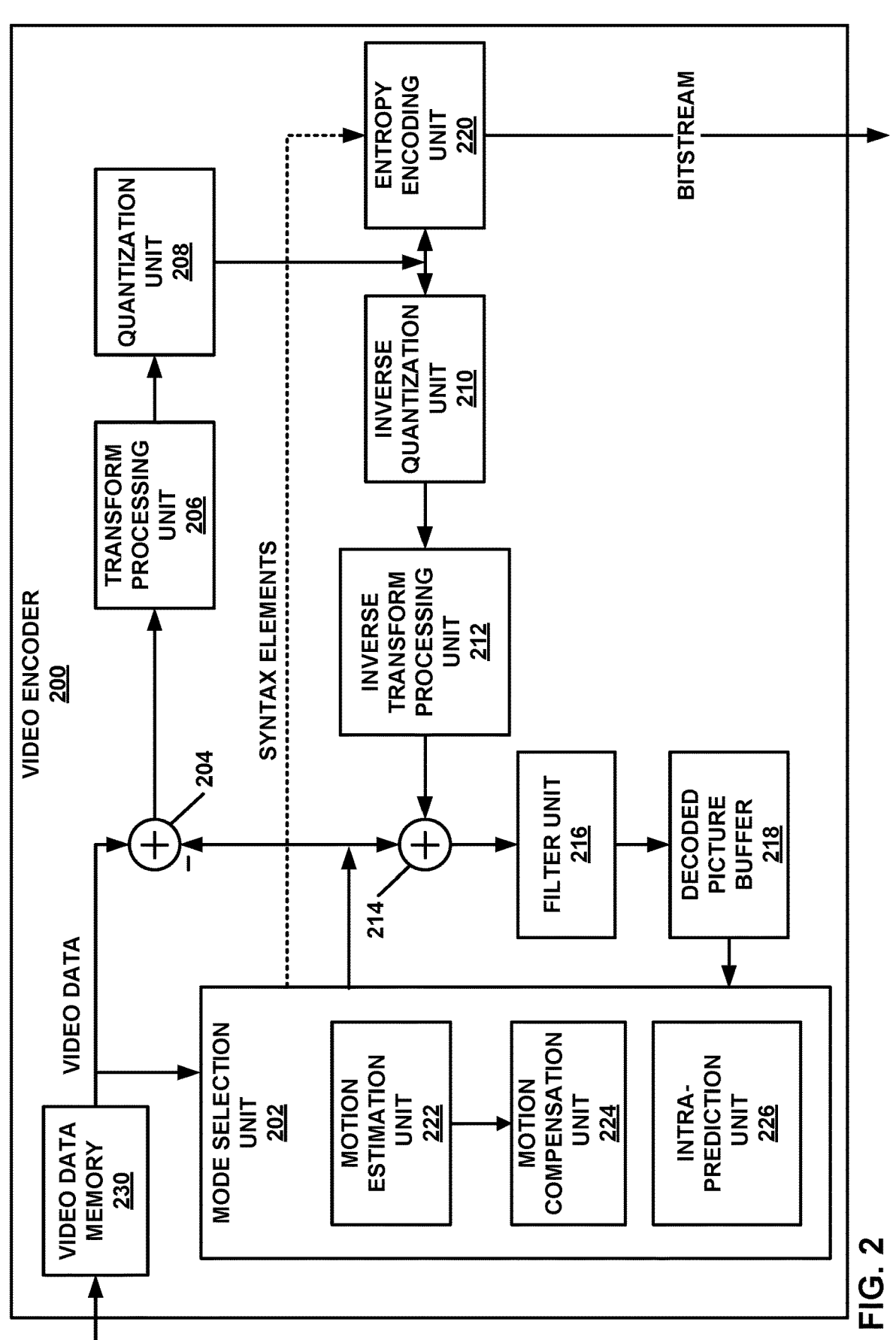
FIG. 2 is a block diagram illustrating an example video encoder that may perform the techniques of this disclosure.

FIG. 2 is a block diagram illustrating an example video encoder 200 that may perform the techniques of this disclosure. FIG. 2 is provided for purposes of explanation and should not be considered limiting of the techniques as broadly exemplified and described in this disclosure. For purposes of explanation, this disclosure describes video encoder 200 according to the techniques of VVC (ITU-T H.266, under development), and HEVC (ITU-T H.265). However, the techniques of this disclosure may be performed by video encoding devices that are configured to other video coding standards and video coding formats, such as AV1 and successors to the AV1 video coding format.

In the example of FIG. 2, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 2 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure, superblock structure, or the quadtree structure described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements used to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 22 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block may not be repeated for the chroma coding blocks. As one example, operations to identify a motion vector (MV) and reference picture for a luma coding block may not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

In one or more examples, for entropy encoding, such as context-based arithmetic encoding, entropy encoding unit 220 may determine context values for one or more contexts. During the encoding of a slice or picture, entropy encoding unit 220 may update the context values (e.g., probability values). However, at the beginning of the slice or picture, it is possible for the context values to be undefined. Rather than starting with undefined context values, entropy encoding unit 220 may use predefined initialization points (e.g., initial values stored in DPB 218, video data memory 230, or some other memory) to initialize the one or more context values.

In one or more examples, rather than or in addition to using predefined initialization points, entropy encoding unit 220 may utilize one or more context values, or mapped, scaled, weighted, etc. versions of one or more context values of a previously encoded slice or picture as initialization points. For instance, entropy encoding unit 220 may store in a buffer (e.g., DPB 218, video data memory 230, or some other memory) one or more context values of a context of an encoded slice or picture (e.g., after encoding the last CTU of the slice or picture) as a set of initialization points. Entropy encoding unit 220 may utilize the set of initialization points (e.g., context values or values based on context values of a previously encoded slice or picture) to initialize context values for a context used for encoding a subsequent slice or picture.

Entropy encoding unit 220 may store sets of initialization points for multiple previously encoded slices or pictures. For instance, the buffer may store a first set of initialization points associated with a first slice or picture, a second set of initialization points associated with a second slice or picture, and so forth. In addition, to determine (e.g., select) which set of initialization points entropy encoding unit 220 may use for a subsequent slice or picture, entropy encoding unit 220 may also store information of the temporal identification value and/or QP value of the slice or picture associated with each of the respective sets of initialization points.

Video encoder 200 represents an example of a device configured to encode video data including a memory configured to store video data, and one or more processing units implemented in circuitry and configured to perform the example techniques described in this disclosure. For instance, in one or more examples, when the buffer is full, entropy encoding unit 220 may determine which set of initialization points to remove to make space for just determined set of initialization points. For instance, entropy encoding unit 220 may determine one or more context values for at least one context used for encoding a current slice or picture. Entropy encoding unit 220 may determine that a buffer for storing sets of temporal initialization points from two or more slices or pictures for context-based arithmetic coding is full. As described, each set of temporal initialization points is associated with a slice or picture of the two or more slices or pictures and includes one or more temporal initialization points.

Entropy encoding unit 220 may determine a first set of temporal initialization points associated with a slice or picture, from among the two or more slices or pictures, based on a temporal identification value or quantization parameter (QP) value of the slice or picture. Entropy encoding unit 220 may remove the first set of temporal initialization points, from the buffer, that is associated with the slice or picture, and store, in the buffer, a second set of temporal initialization points associated with the current slice or picture. The second set of temporal initialization points are based on the determined one or more context values (e.g., equal to the determined one or more context values for the at least one context of the current slice, or picture or derived from the one or more context values for the at least one context of the current slice or picture).

Accordingly, instead of using when a slice or picture was encoded as the only factor for determining (e.g., selecting) which set of initialization points should be removed from the buffer, entropy encoding unit 220 may utilize temporal identification values and/or QP values to determine which set of initialization points to remove, including possibly slice type. For example, to determine the first set of temporal initialization points, entropy encoding unit 220 may determine the first set of temporal initialization points associated with the slice or picture, from among the two or more slices or pictures, having at least one of a smallest temporal identification value or quantization parameter (QP) value. For instance, entropy encoding unit 220 may determine the slice or picture having the smallest temporal identification value from among temporal identification values of the two or more slices or pictures, or determine the slice or picture having the smallest QP value from among QP values of the two or more slices or pictures. Entropy encoding unit 220 may then remove from the buffer the set of initialization points associated with the determined slice or picture (e.g., the one having the smallest temporal identification value or QP value).

In one or more examples, entropy encoding unit 220 may remove the set of initialization points associated with the slice or picture having the smallest temporal identification value or QP value if none of the sets of initialization points are associated with a slice or picture having a temporal identification value or QP value that is the same as the temporal identification value or QP value of the current slice or picture. For example, entropy encoding unit 220 may determine that at least one of a temporal identification value or QP value for the current slice or picture is different than a temporal identification value or QP value for each of the two or more slices or pictures. In this example, entropy encoding unit 220 may remove the first set of temporal initialization points based on the determination that at least one of the temporal identification value or QP value for the current slice or picture is different than the temporal identification value or QP value for each of the two or more slices or pictures. For example, the temporal identification value or QP value of the slice or picture associated with the first set of temporal initialization points is different than the temporal identification value or QP value of the current slice or picture.

As an example, assume that the current slice or picture is a first slice or picture. In this example, entropy encoding unit 220 may determine one or more context values for at least one context used for encoding a second slice or picture, and determine a third slice or picture, from the two or more slices or pictures, having at least one of a temporal identification value or QP value that is same as a temporal identification value or QP value of the second slice or picture. In this example, entropy encoding unit 220 may remove a third set of temporal initialization points, from the buffer, that is associated with the third slice or picture, and store, in the buffer, a fourth set of temporal initialization points associated with the second slice or picture based on the determined one or more context values for at least one context used for encoding the second slice or picture.

Then for encoding a subsequent picture, entropy encoding unit 220 may determine (e.g., select) a set of temporal initialization points stored in the buffer, and initialize one or more context values for at least one context used for encoding a subsequent slice or picture based on the selected set of temporal initialization points. For example, entropy encoding unit 220 may assign the initial values for the one or more context values equal to selected set of temporal initialization points or derive the initial values for the one or more context values based on (e.g., with mapping, scaling, weighting, etc.) the selected set of temporal initialization points. Entropy encoding unit 220 may context-based arithmetic encode the subsequent slice or picture. For instance, entropy encoding unit 220 may utilize the initial values for the context values for encoding syntax elements for the subsequent slice or picture, and updating the context values during the encoding of the subsequent slice or picture.

In one or more examples, video encoder 200 may also be configured to store a plurality of temporal initialization points for one or more contexts used in context-based arithmetic coding of the video data of a current picture or slice, wherein the plurality of temporal initialization points are included in video data of one or more previous pictures that precede the current picture in coding order, store respective temporal identification (ID) values associated with each of the plurality of temporal initialization points, select at least one temporal initialization point of the plurality of temporal initialization points based on the respective temporal ID values associated with the plurality of temporal initialization points and a temporal ID value of the current picture or slice, and context-based arithmetic encode the video data of the current picture or slice based on the selected at least one temporal initialization point.

Video encoder 200 may be configured to store, in a first buffer, one or more temporal initialization points for one or more contexts used in context-based arithmetic coding of the video data of one or more previous pictures, store, in a second buffer, a temporal initialization point for one or more contexts used in context-based arithmetic coding of the video data of a slice of a current picture, wherein storing, in the second buffer, comprises storing, in the second buffer, during a coding of the video data of the current picture, and subsequent to processing a last coding tree unit (CTU) or slice of the current picture, store the temporal initialization point stored in the second buffer in the first buffer.

Video encoder 200 may be configured to store a previous temporal initialization point for one or more contexts used in context-based arithmetic coding of the video data of a previous slice in a previous picture, for a current slice, determine that the current slice in the current picture has a location in the current picture that corresponds to a location of the previous slice in the previous picture, based on the current slice having the location in the current picture that corresponds to the location of the previous slice in the previous picture, determining a current temporal initialization point for the current slice based on the previous temporal initialization point.

Figure 3:
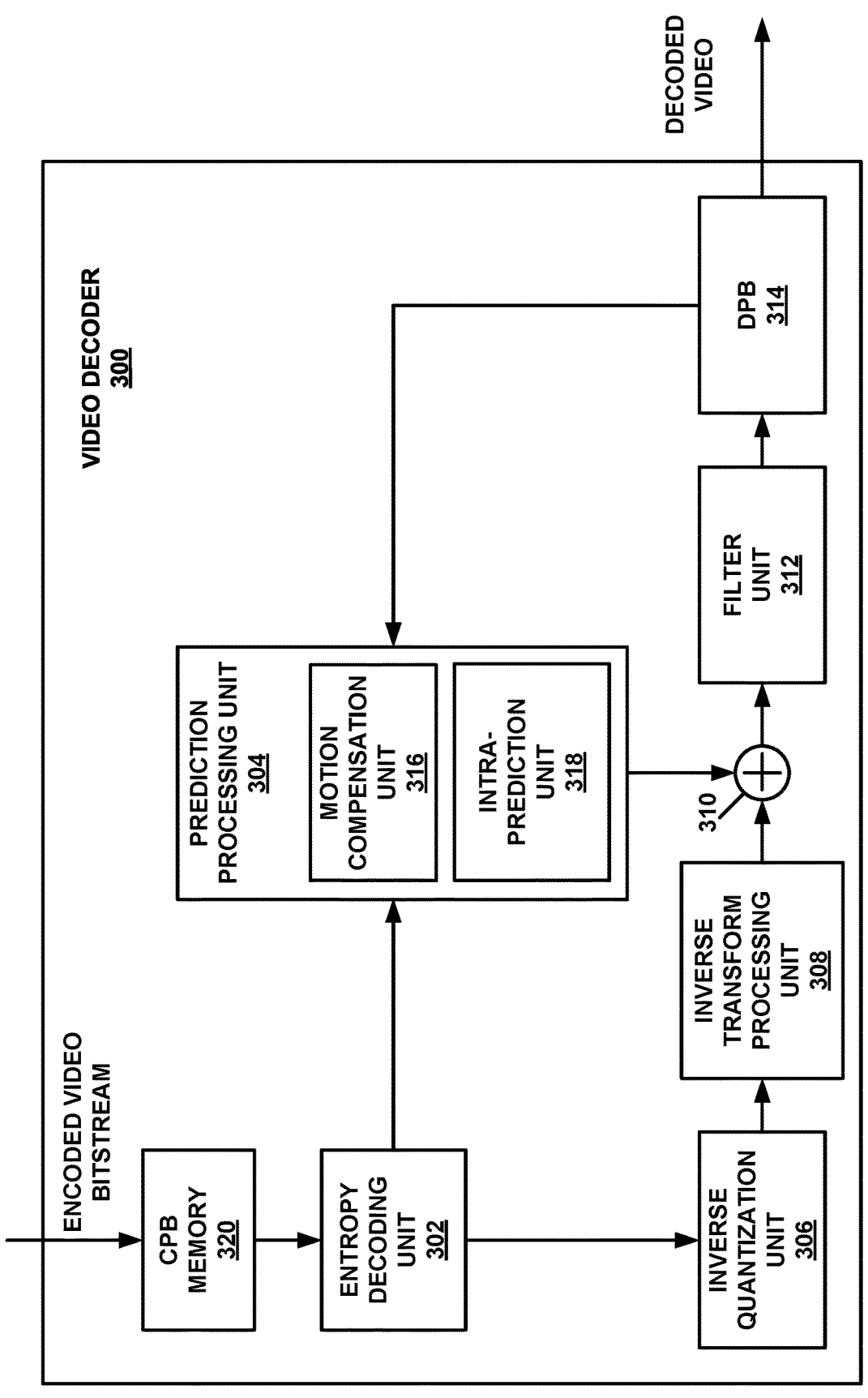
FIG. 3 is a block diagram illustrating an example video decoder that may perform the techniques of this disclosure.

FIG. 3 is a block diagram illustrating an example video decoder 300 that may perform the techniques of this disclosure. FIG. 3 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 3, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, intra block copy (IBC), and/or color palette mode, as described above.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 3 are illustrated to assist with understanding the operations performed by video decoder 300. The units may be implemented as fixed-function circuits, programmable circuits, or a combination thereof. Similar to FIG. 2, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 2).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 2). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to perform example techniques described in this disclosure. For example, for entropy decoding, such as context-based arithmetic decoding, entropy decoding unit 302 may determine context values for one or more contexts. During the decoding of a slice or picture, entropy decoding unit 302 may update the context values (e.g., probability values). However, at the beginning of the slice or picture, it is possible for the context values to be undefined. Rather than starting with undefined context values, entropy decoding unit 302 may use predefined initialization points (e.g., initial values stored in DPB 314, CPB memory 320, or some other memory) to initialize the one or more context values.

In one or more examples, rather than or in addition to using predefined initialization points, entropy decoding unit 302 may utilize one or more context values, or mapped, scaled, weighted, etc. versions of one or more context values of a previously decoded slice or picture as initialization points. For instance, entropy decoding unit 302 may store in a buffer (e.g., DPB 314, CPB memory 320, or some other memory) one or more context values of a context of an decoded slice or picture (e.g., after decoding the last CTU of the slice or picture) as a set of initialization points. Entropy decoding unit 302 may utilize the set of initialization points (e.g., context values or values based on context values of a previously decoded slice or picture) to initialize context values for a context used for decoding a subsequent slice or picture.

Entropy decoding unit 302 may store sets of initialization points for multiple previously decoded slices or pictures. For instance, the buffer may store a first set of initialization points associated with a first slice or picture, a second set of initialization points associated with a second slice or picture, and so forth. In addition, to determine (e.g., select) which set of initialization points entropy decoding unit 302 may use for a subsequent slice or picture, entropy decoding unit 302 may also store information of the temporal identification value and/or QP value of the slice or picture associated with each of the respective sets of initialization points.

In one or more examples, when the buffer is full, entropy decoding unit 302 may determine which set of initialization points to remove to make space for just determined set of initialization points. For instance, entropy decoding unit 302 may determine one or more context values for at least one context used for decoding a current slice or picture. Entropy decoding unit 302 may determine that a buffer for storing sets of temporal initialization points from two or more slices or pictures for context-based arithmetic coding is full. As described, each set of temporal initialization points is associated with a slice or picture of the two or more slices or pictures and includes one or more temporal initialization points.

Entropy decoding unit 302 may determine a first set of temporal initialization points associated with a slice or picture, from among the two or more slices or pictures, based on a temporal identification value or quantization parameter (QP) value of the slice or picture. Entropy decoding unit 302 may remove the first set of temporal initialization points, from the buffer, that is associated with the slice or picture, and store, in the buffer, a second set of temporal initialization points associated with the current slice or picture. The second set of temporal initialization points are based on the determined one or more context values (e.g., equal to the determined one or more context values for the at least one context of the current slice, or picture or derived from the one or more context values for the at least one context of the current slice or picture).

Accordingly, instead of using when a slice or picture was decoded as the only factor for determining (e.g., selecting) which set of initialization points should be removed from the buffer, entropy decoding unit 302 may utilize temporal identification values and/or QP values to determine which set of initialization points to remove. For example, to determine the first set of temporal initialization points, entropy decoding unit 302 may determine the first set of temporal initialization points associated with the slice or picture, from among the two or more slices or pictures, having at least one of a smallest temporal identification value or quantization parameter (QP) value. For instance, entropy decoding unit 302 may determine the slice or picture having the smallest temporal identification value from among the temporal identification values of the two or more slices or pictures, or determine the slice or picture having the smallest QP value from among QP values of the two or more slices or pictures. Entropy decoding unit 302 may then remove from the buffer the set of initialization points associated with the determined slice or picture (e.g., the one having the smallest temporal identification value or QP value).

In one or more examples, entropy decoding unit 302 may remove the set of initialization points associated with the slice or picture having the smallest temporal identification value or QP value if none of the sets of initialization points are associated with a slice or picture having a temporal identification value or QP value that is the same as the temporal identification value or QP value of the current slice or picture. For example, entropy decoding unit 302 may determine that at least one of a temporal identification value or QP value for the current slice or picture is different than a temporal identification value or QP value for each of the two or more slices or pictures. In this example, entropy decoding unit 302 may remove the first set of temporal initialization points based on the determination that at least one of the temporal identification value or QP value for the current slice or picture is different than the temporal identification value or QP value for each of the two or more slices or pictures. For example, the temporal identification value or QP value of the slice or picture associated with the first set of temporal initialization points is different than the temporal identification value or QP value of the current slice or picture.

As an example, assume that the current slice or picture is a first slice or picture. In this example, entropy decoding unit 302 may determine one or more context values for at least one context used for decoding a second slice or picture, and determine a third slice or picture, from the two or more slices or pictures, having at least one of a temporal identification value or QP value that is same as a temporal identification value or QP value of the second slice or picture. In this example, entropy decoding unit 302 may remove a third set of temporal initialization points, from the buffer, that is associated with the third slice or picture, and store, in the buffer, a fourth set of temporal initialization points associated with the second slice or picture based on the determined one or more context values for at least one context used for decoding the second slice or picture.

Then for decoding a subsequent picture, entropy decoding unit 302 may determine (e.g., select) a set of temporal initialization points stored in the buffer, and initialize one or more context values for at least one context used for decoding a subsequent slice or picture based on the selected set of temporal initialization points. For example, entropy decoding unit 302 may assign the initial values for the one or more context values equal to selected set of temporal initialization points or derive the initial values for the one or more context values based on (e.g., with mapping, scaling, weighting, etc.) the selected set of temporal initialization points. Entropy decoding unit 302 may context-based arithmetic decode the subsequent slice or picture. For instance, entropy decoding unit 302 may utilize the initial values for the context values for decoding syntax elements for the subsequent slice or picture, and updating the context values during the decoding of the subsequent slice or picture.

In one or more examples, video decoder 300 may also be configured to store a plurality of temporal initialization points for one or more contexts used in context-based arithmetic coding of the video data of a current picture or slice, wherein the plurality of temporal initialization points are included in video data of one or more previous pictures that precede the current picture in coding order, store respective temporal identification (ID) values associated with each of the plurality of temporal initialization points, select at least one temporal initialization point of the plurality of temporal initialization points based on the respective temporal ID values associated with the plurality of temporal initialization points and a temporal ID value of the current picture or slice, and context-based arithmetic decode the video data of the current picture or slice based on the selected at least one temporal initialization point.

Video decoder 300 may be configured to store, in a first buffer, one or more temporal initialization points for one or more contexts used in context-based arithmetic coding of the video data of one or more previous pictures, store, in a second buffer, a temporal initialization point for one or more contexts used in context-based arithmetic coding of the video data of a slice of a current picture, wherein storing, in the second buffer, comprises storing, in the second buffer, during a coding of the video data of the current picture, and subsequent to processing a last coding tree unit (CTU) or slice of the current picture, store the temporal initialization point stored in the second buffer in the first buffer.

Video decoder 300 may be configured to store a previous temporal initialization point for one or more contexts used in context-based arithmetic coding of the video data of a previous slice in a previous picture, for a current slice, determine that the current slice in the current picture has a location in the current picture that corresponds to a location of the previous slice in the previous picture, based on the current slice having the location in the current picture that corresponds to the location of the previous slice in the previous picture, determining a current temporal initialization point for the current slice based on the previous temporal initialization point.

Figure 4:
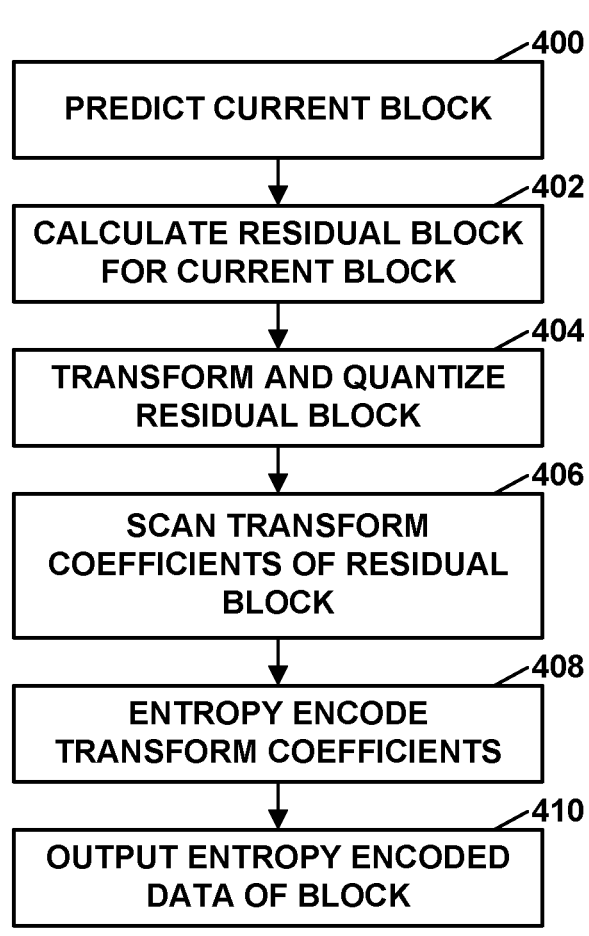
FIG. 4 is a flowchart illustrating an example method for encoding a current block in accordance with the techniques of this disclosure.

FIG. 4 is a flowchart illustrating an example method for encoding a current block in accordance with the techniques of this disclosure. The current block may comprise a current CU. Although described with respect to video encoder 200 (FIGS. 1 and 2), it should be understood that other devices may be configured to perform a method similar to that of FIG. 4.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. In accordance with one or more examples, video encoder 200 may encode the transform coefficients using context values that are determined using the techniques described in this disclosure. Video encoder 200 may then output the entropy encoded data of the block (410).

Figure 5:
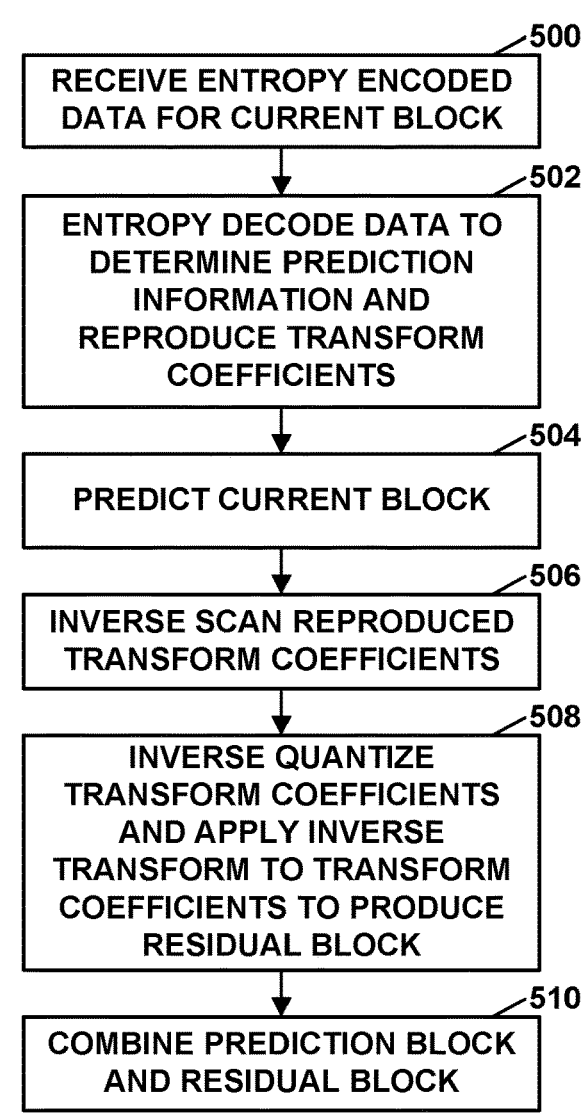
FIG. 5 is a flowchart illustrating an example method for decoding a current block in accordance with the techniques of this disclosure.

FIG. 5 is a flowchart illustrating an example method for decoding a current block of video data in accordance with the techniques of this disclosure. The current block may comprise a current CU. Although described with respect to video decoder 300 (FIGS. 1 and 3), it should be understood that other devices may be configured to perform a method similar to that of FIG. 5.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). In accordance with one or more examples, video decoder 300 may decode the encoded data using context values that are determined using the techniques described in this disclosure. Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

FIG. 6 is a flowchart illustrating an example method of processing video data. For ease of description, the example of FIG. 6 is described with respect to processing circuitry, examples of which include processing circuitry of video encoder 200 and video decoder 300, and a buffer, examples of which include memory 106, memory 120, video data memory 230, DPB 218, CPB memory 320, DPB 314, or any other memory for video encoder 200 or video decoder 300.

The processing circuitry may be configured to determine one or more context values for at least one context used for encoding or decoding a current slice or picture (600). For example, as video encoder 200 and video decoder 300 are encoding or decoding the current slice or picture, video encoder 200 and video decoder 300 may be updating context values for a context-based on recently encoded or decoded video data of the slice or picture.

The processing circuitry may determine that a buffer for storing sets of temporal initialization points from two or more slices or pictures for context-based arithmetic coding is full (602). As described, each set of temporal initialization points is associated with a slice or picture of the two or more slices or pictures and includes one or more temporal initialization points. For instance, there may be a limitation of the number of sets of temporal initialization points that the buffer can store to keep the size of the buffer practical. As an example, the buffer may store up to five sets of temporal initialization points.

The processing circuitry may determine (e.g., identify) a first set of temporal initialization points associated with a slice or picture, from among the two or more slices or pictures, based on at least one of slice type, temporal identification value, or quantization parameter (QP) value of the slice or picture (604). For instance, the buffer may also store the temporal identification values, QP values, and/or slice type information of the slices and pictures associated with the respective sets of initialization points stored in the buffer.

As one example, to determine the first set of temporal initialization points, the processing circuitry may be configured to determine the first set of temporal initialization points associated with the slice or picture, from among the two or more slices or pictures, having at least one of a smallest temporal identification value or quantization parameter (QP) value. For instance, the processing circuitry may determine the slice or picture having the smallest temporal identification value from among the temporal identification values of the two or more slices or pictures, and/or determine the slice or picture having the smallest QP value from among QP values of the two or more slices or pictures.

In some examples, the first set of initialization points having a smallest temporal identification value or QP value may have a different slice type than the current slice. In some examples, such as where multiple sets of temporal initialization points can be stored for a slice type, video encoder 200 and video decoder 300 may determine a grouping of sets of temporal initialization points associated with a slices having the same slice type as the current slice. Video encoder 200 and video decoder 300 may then determine a set of temporal initialization points within this grouping having a smallest temporal identification value or QP value, as the first set of temporal initialization points.

The processing circuitry may remove the first set of temporal initialization points, from the buffer, that is associated with the slice or picture (606). The processing circuitry may store, in the buffer, a second set of temporal initialization points associated with the current slice or picture (608). The second set of temporal initialization points are based on the determined one or more context values (e.g., equal to or derived from the determined one or more context values for the context of the current slice or picture). In some examples, subsequent to processing a last coding tree unit (CTU) of the current slice or picture, the processing circuitry may store the second set of temporal initialization points.

In one or more examples, for a subsequent slice or picture in coding order, the processing circuitry may determine (e.g., select) a set of temporal initialization points stored in the buffer. The processing circuitry may initialize one or more context values for at least one context used for encoding or decoding a subsequent slice or picture based on the selected set of temporal initialization points (e.g., set initial values for the context values equal to selected set of temporal initialization points or derive the initial values for the context values based on the selected set of temporal initialization points). The processing circuitry may context-based arithmetic encode or decode the subsequent slice or picture.

FIG. 7 is a flowchart illustrating another example method of processing video data. For ease of description, the example of FIG. 7 is described with respect to processing circuitry, examples of which include processing circuitry of video encoder 200 and video decoder 300, and a buffer, examples of which include memory 106, memory 120, video data memory 230, DPB 218, CPB memory 320, DPB 314, or any other memory for video encoder 200 or video decoder 300.

As described above, the processing circuitry may remove a set of temporal initialization points associated with a slice or picture having smallest temporal identification value or QP value. However, in some examples, the processing circuitry may perform such removal process if there is no set of temporal initialization points associated with a slice or picture having same temporal identification value, QP value, or slice type as current slice or picture.

For instance, assume that the current slice or picture of FIG. 6 is a first slice or picture. In this example, the processing circuitry may determine one or more context values for at least one context used for encoding or decoding a second slice or picture (700). That is, the processing circuitry may perform similar encoding or decoding operations on the second slice or picture, and update context values as described above.

The processing circuitry may determine a third slice or picture, from the two or more slices or pictures, having at least one of a temporal identification value, QP value, or slice type that is same as a temporal identification value, QP value, or slice type of the second slice or picture (702). In this example, rather than removing the set of initialization points associated with slice or picture having smallest temporal identification value or QP value, the processing circuitry may remove a third set of temporal initialization points, from the buffer, that is associated with the third slice or picture (704). The processing circuitry may store, in the buffer, a fourth set of temporal initialization points associated with the second slice or picture based on the determined one or more context values for at least one context used for encoding or decoding the second slice or picture (706).

The example of FIG. 7 is provided for illustration purposes only, and should not be considered limiting. In some examples, the processing circuitry may not perform the method of FIG. 7. Rather, the processing circuitry may remove the set of initialization points based on the temporal identification value or QP value (e.g., the set of temporal initialization points associated with the slice or picture having the smallest temporal identification value or QP value). Also, the slice type may not be considered as one of the factors. That is, the processing circuitry may remove an entry of a set of temporal initialization points which has the same slice type and/or same temporal identification value and/or same QP value as the current slice or picture.

Figure 8:
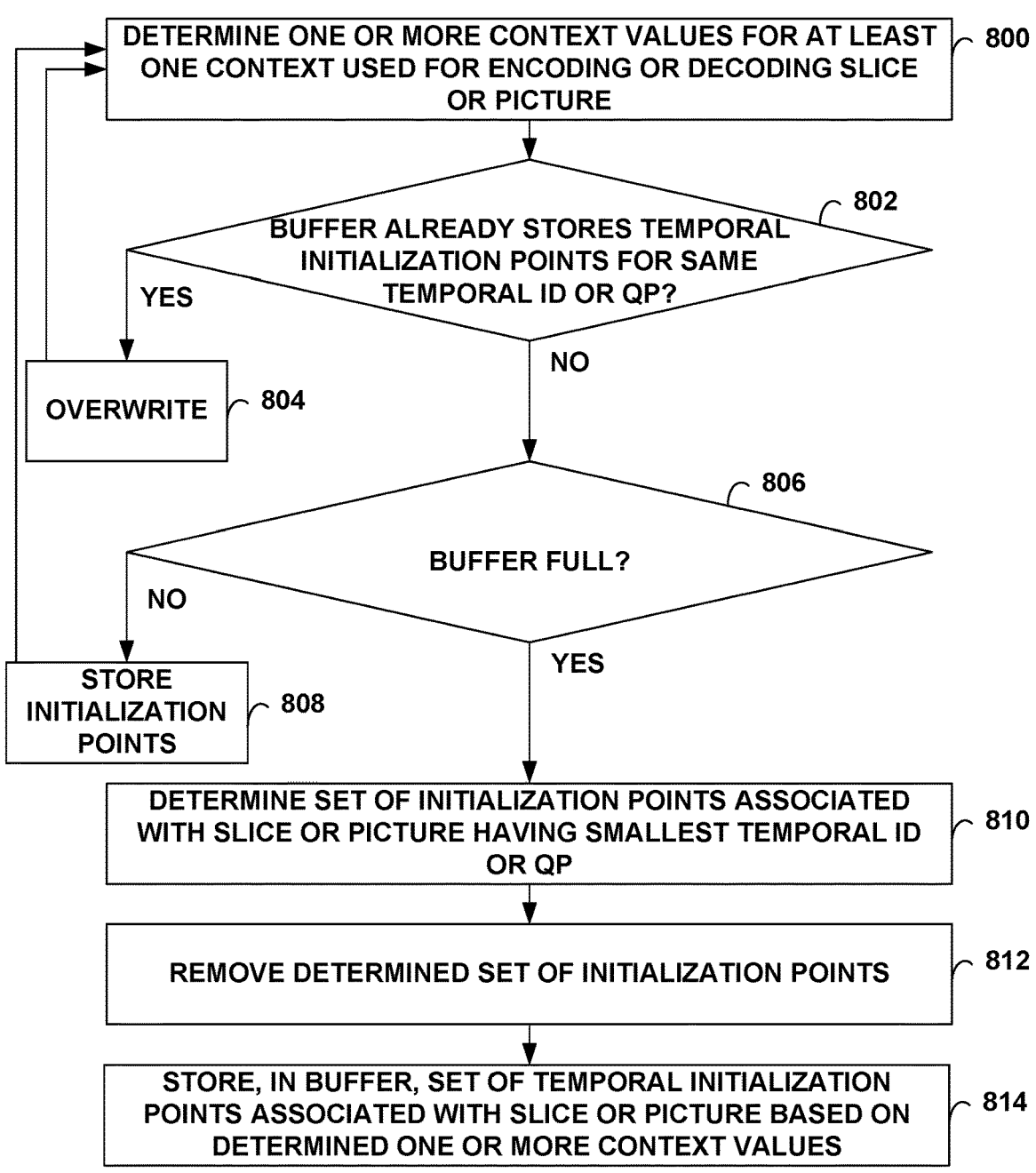
FIG. 8 is a flowchart illustrating another example method of processing video data.

FIG. 8 is a flowchart illustrating another example method of processing video data. For ease of description, the example of FIG. 8 is described with respect to processing circuitry, examples of which include processing circuitry of video encoder 200 and video decoder 300, and a buffer, examples of which include memory 106, memory 120, video data memory 230, DPB 218, CPB memory 320, DPB 314, or any other memory for video encoder 200 or video decoder 300.

Similar to FIGS. 6 and 7, the processing circuitry may determine one or more context values for at least one context used for encoding decoding a current slice or picture (800). In one or more examples, the processing circuitry may determine whether the buffer already stores a set of temporal initialization points for a slice or picture having the same temporal identification value or QP value as the current slice or picture (802).

If the buffer already stores a set of temporal initialization points for a slice or picture having the same temporal identification value or QP value as the current slice or picture (YES at 802), the processing circuitry may overwrite (804) the stored set of temporal initialization points with the temporal initialization points of the current slice or picture (e.g., the determined one or more context values or derived from the one or more context values). The processing circuitry may then set the next slice or picture as the current slice or picture and return to determining one or more context values for at least one context used for encoding decoding a current slice or picture (800).

If the buffer does not already store a set of temporal initialization points for a slice or picture having the same temporal identification value or QP value as the current slice or picture (NO at 802), the processing circuitry may determine whether the buffer is full (806). If the buffer is not full (NO at 806), the processing circuitry may store the temporal initialization points (e.g., context values of the current slice or picture, or values derived from the context values of the current slice or picture) in the buffer (808). The processing circuitry may then set the next slice or picture as the current slice or picture and return to determining one or more context values for at least one context used for encoding decoding a current slice or picture (800).

If the buffer is full (YES at 806), the processing circuitry may determine (e.g., identify) a first set of temporal initialization points associated with a slice or picture, from among the two or more slices or pictures, having at least one of a smallest temporal identification value or quantization parameter (QP) value (810). Similar to FIG. 6, the processing circuitry may remove the first set of temporal initialization points, from the buffer, that is associated with the slice or picture (812), and store, in the buffer, a second set of temporal initialization points associated with the current slice or picture, wherein the second set of temporal initialization points are based on the determined one or more context values (814).

The example order of operations illustrated in FIG. 8 and performed by the processing circuitry should not be considered as limiting. For instance, the processing circuitry may first determine if the buffer is full (806), and if the buffer is not full, the processing circuitry may store the initialization points (808) even if the buffer already stores temporal initialization points for slice or picture having same temporal identification value or QP value as current slice or picture. As another example, if the buffer is full, the processing circuitry may remove the set of temporal initialization points associated with the slice or picture having the smallest temporal identification value or QP value even if the buffer already stores temporal initialization points for slice or picture having same temporal identification value or QP value as current slice or picture. Other modifications to the order of operations are possible.

Techniques illustrated by reference numerals 804 and 812 include examples of removal of a set of initialization points. In general, the processing circuitry may first determine if the buffer stores temporal initialization points for the same temporal ID or QP value as current slice or picture, and if yes, removes that set of temporal initialization points and writes the temporal initialization points for the current slice or picture. Otherwise, the processing circuitry may remove determined (e.g., identified) set of initialization points where the determined set of initialization points is associated with a slice or picture having smallest temporal identification value or QP value.

This following describes example techniques that may be performed together or separately.

Clause 1. A method of coding video data, the method comprising storing a plurality of temporal initialization points for one or more contexts used in context-based arithmetic coding of the video data of a current picture or slice, wherein the plurality of temporal initialization points are included in video data of one or more previous pictures that precede the current picture in coding order; storing respective temporal identification (ID) values associated with each of the plurality of temporal initialization points; selecting at least one (e.g., if available) temporal initialization point of the plurality of temporal initialization points based on the respective temporal ID values associated with the plurality of temporal initialization points and a temporal ID value of the current picture or slice; and context-based arithmetic coding the video data of the current picture or slice based on the selected at least one temporal initialization point.

Clause 2. The method of clause 1, wherein selecting the at least one temporal initialization point comprises: determining a set of temporal initialization points of the plurality of temporal initialization points, wherein the respective temporal ID values for temporal initialization points in the set of temporal initialization points is less than or equal to the temporal ID value of the current picture or slice; and selecting the at least one temporal initialization point from the set of temporal initialization points.

Clause 3. The method of clause 1, wherein selecting the at least one temporal initialization point comprises: determining a set of temporal initialization points of the plurality of temporal initialization points, wherein the respective temporal ID values for temporal initialization points in the set of temporal initialization points is equal to the temporal ID value of the current picture or slice; and selecting the at least one temporal initialization point from the set of temporal initialization points.

Clause 4. The method of clause 1, wherein selecting the at least one temporal initialization point comprises: determining that no temporal initialization point in the plurality of temporal initialization points has a temporal ID value that is equal to the temporal ID value of the current picture or slice; based on a determination that no temporal initialization point in the plurality of temporal initialization points has a temporal ID value that is equal to the temporal ID value of the current picture or slice, determining whether any temporal initialization point in the plurality of temporal initialization points has a temporal ID value that is one less than the temporal ID value of the current picture or slice; and based on the determination that there are one or more temporal initialization points having a temporal ID value that is one less than the temporal ID value of the current picture or slice, selecting the at least one temporal initialization point from the one or more temporal initialization points having the temporal ID value that is one less than the temporal ID value of the current picture or slice.

Clause 5. A method of coding video data, the method comprising: storing, in a first buffer, one or more temporal initialization points for one or more contexts used in context-based arithmetic coding of the video data of one or more previous pictures; storing, in a second buffer, a temporal initialization point for one or more contexts used in context-based arithmetic coding of the video data of a slice of a current picture, wherein storing, in the second buffer, comprises storing, in the second buffer, during a coding of the video data of the current picture; and subsequent to processing a last coding tree unit (CTU) or slice of the current picture, storing the temporal initialization point stored in the second buffer in the first buffer.

Clause 6. The method of any of clauses 1-4, wherein storing the plurality of temporal initialization points comprises storing the plurality of temporal initialization points in accordance with the method of clause 5.

Clause 7. A method of coding video data, the method comprising: storing a previous temporal initialization point for one or more contexts used in context-based arithmetic coding of the video data of a previous slice in a previous picture; for a current slice, determining that the current slice in the current picture has a location in the current picture that corresponds to a location of the previous slice in the previous picture; based on the current slice having the location in the current picture that corresponds to the location of the previous slice in the previous picture, determining a current temporal initialization point for the current slice based on the previous temporal initialization point.

Clause 8. A method of coding video data comprising a combination of any of clauses 1-7.

Clause 9. The method of any of clauses 1-8, wherein context-based arithmetic coding comprises context-adaptive binary arithmetic coding (CABAC).

Clause 10. The method of any of clauses 1-9, wherein context-based arithmetic coding comprises context-based arithmetic decoding.

Clause 11. The method of any of clauses 1-9, wherein context-based arithmetic coding comprises context-based arithmetic encoding.

Clause 12. A device for coding video data, the device comprising: memory configured to store video data; and processing circuitry configured to perform the method of any one or combination of clauses 1-11.

Clause 13. The device of clause 12, wherein the device comprises a video decoder.

Clause 14. The device of any of clauses 12 and 13, wherein the device comprises a video encoder.

Clause 15. The device of any of clauses 12-14, further comprising a display configured to display decoded video data.

Clause 16. The device of any of clauses 12-15, wherein the device comprises one or more of a camera, a computer, a mobile device, a broadcast receiver device, or a set-top box.

Clause 17. A computer-readable storage medium having stored thereon instructions that, when executed, cause one or more processors to perform the method of any of clauses 1-11.

Clause 18. A device for coding video data, the device comprising means for performing the method of any one or combination of clauses 1-11.

Clause 1A. A method of processing video data, the method comprising: determining one or more context values for at least one context used for encoding or decoding a current slice or picture; determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; determining a first set of temporal initialization points associated with a slice or picture, from among the two or more slices or pictures, based on at least one of a slice type, a temporal identification value, or a quantization parameter (QP) value of the slice or picture; removing the first set of temporal initialization points, from the buffer, that is associated with the slice or picture; and storing, in the buffer, a second set of temporal initialization points associated with the current slice or picture, wherein the second set of temporal initialization points are based on the determined one or more context values.

Clause 2A. The method of clause 1A, wherein determining the first set of temporal initialization points comprises determining the first set of temporal initialization points associated with the slice or picture, from among the two or more slices or pictures, having at least one of a smallest temporal identification value or quantization parameter (QP) value from among temporal identification values or QP values of the two or more slices or pictures.

Clause 3A. The method of clause 2A, wherein determining the slice or picture having at least one of the smallest temporal identification value or QP value from among the two or more slices or pictures comprises determining the slice or picture having the smallest temporal identification value from among temporal identification values of the two or more slices or pictures.

Clause 4A. The method of clause 2A, wherein determining the slice or picture having at least one of the smallest temporal identification value or QP value from among the two or more slices or pictures comprises determining the slice or picture having the smallest QP value from among QP values of the two or more slices or pictures.

Clause 5A. The method of any of clauses 1A-4A, further comprising: determining that at least one of a temporal identification value or QP value for the current slice or picture is different than a temporal identification value or QP value for each of the two or more slices or pictures, wherein the temporal identification value or QP value of the slice or picture associated with the first set of temporal initialization points is different than the temporal identification value or QP value of the current slice or picture, and wherein removing the first set of temporal initialization points comprises removing the first set of temporal initialization points based on the determination that at least one of the temporal identification value or QP value for the current slice or picture is different than the temporal identification value or QP value for each of the two or more slices or pictures.

Clause 6A. The method of any of clauses 1A-5A, wherein the current slice or picture is a first slice or picture, the method further comprising: determining one or more context values for at least one context used for encoding or decoding a second slice or picture; determining a third slice or picture, from the two or more slices or pictures, having at least one of a temporal identification value, QP value, or slice type that is same as a temporal identification value, QP value, or slice type of the second slice or picture; removing a third set of temporal initialization points, from the buffer, that is associated with the third slice or picture; and storing, in the buffer, a fourth set of temporal initialization points associated with the second slice or picture based on the determined one or more context values for at least one context used for encoding or decoding the second slice or picture.

Clause 7A. The method of any of clauses 1A-6A, further comprising: determining a set of temporal initialization points stored in the buffer; initializing one or more context values for at least one context used for encoding or decoding a subsequent slice or picture based on the determined set of temporal initialization points; and context-based arithmetic encoding or decoding the subsequent slice or picture.

Clause 8A. The method of clause 7A, further comprising: determining a temporal identification value for the subsequent slice or picture; determining that none of two or more slices or pictures having associated sets of temporal initialization points stored in the buffer have a temporal identification value equal to the temporal identification value for the subsequent slice or picture; determining a second slice or picture from among the two or more slices or pictures having a temporal identification value that is closest to and less than the temporal identification value of the subsequent slice or picture, wherein determining the set of temporal initialization points comprises selecting the set of temporal initialization points associated with the second slice or picture.

Clause 9A. The method of clause 7A, further comprising: determining a QP value for the subsequent slice or picture; determining that none of two or more slices or pictures having associated sets of temporal initialization points stored in the buffer have a QP value equal to the QP value for the subsequent slice or picture; determining a second slice or picture from among the two or more slices or pictures having a QP value that is closest to the QP value of the subsequent slice or picture, wherein determining the set of temporal initialization points comprises selecting the set of initialization points associated with the second slice or picture.

Clause 10A. The method of any of clauses 1A-9A, wherein storing the second set of initialization points comprises, subsequent to processing a last coding tree unit (CTU) of the current slice or picture, storing the second set of temporal initialization points.

Clause 11A. A device for processing video data, the device comprising: a buffer configured to store sets of temporal initialization points from two or more slices or pictures for context-based arithmetic coding; and processing circuitry coupled to the buffer, the processing circuitry configured to: determine one or more context values for at least one context used for encoding or decoding a current slice or picture; determine that the buffer for storing sets of temporal initialization points from two or more slices or pictures for context-based arithmetic coding is full, wherein each set of temporal initialization points is associated with a slice or picture of the two or more slices or pictures and includes one or more temporal initialization points; determine a first set of temporal initialization points associated with a slice or picture, from among the two or more slices or pictures, based on at least one of a slice type, a temporal identification value, or a quantization parameter (QP) value of the slice or picture; remove the first set of temporal initialization points, from the buffer, that is associated with the slice or picture; and store, in the buffer, a second set of temporal initialization points associated with the current slice or picture, wherein the second set of temporal initialization points are based on the determined one or more context values.

Clause 12A. The device of clause 11A, wherein to determine the first set of temporal initialization points, the processing circuitry is configured to determine the first set of temporal initialization points associated with the slice or picture, from among the two or more slices or pictures, having at least one of a smallest temporal identification value or quantization parameter (QP) value from among temporal identification values or QP values of the two or more slices or pictures.

Clause 13A. The device of clause 12A, wherein to determine the slice or picture having at least one of the smallest temporal identification value or QP value from among the two or more slices or pictures, the processing circuitry is configured to determine the slice or picture having the smallest temporal identification value from among temporal identification values of the two or more slices or pictures.

Clause 14A. The device of clause 12A, wherein to determine the slice or picture having at least one of the smallest temporal identification value or QP value from among the two or more slices or pictures, the processing circuitry is configured to determine the slice or picture having the smallest QP value from QP values of the two or more slices or pictures.

Clause 15A. The device of any of clauses 11A-14A, wherein the processing circuitry is configured to: determine that at least one of a temporal identification value or QP value for the current slice or picture is different than a temporal identification value or QP value for each of the two or more slices or pictures, wherein the temporal identification value or QP value of the slice or picture associated with the first set of temporal initialization points is different than the temporal identification value or QP value of the current slice or picture, and wherein to remove the first set of temporal initialization points, the processing circuitry is configured to remove the first set of temporal initialization points based on the determination that at least one of the temporal identification value or QP value for the current slice or picture is different than the temporal identification value or QP value for each of the two or more slices or pictures.

Clause 16A. The device of any of clauses 11A-15A, wherein the current slice or picture is a first slice or picture, and wherein the processing circuitry is configured to: determine one or more context values for at least one context used for encoding or decoding a second slice or picture; determine a third slice or picture, from the two or more slices or pictures, having at least one of a temporal identification value, QP value, or slice type that is same as a temporal identification value, QP value, or slice type of the second slice or picture; remove a third set of temporal initialization points, from the buffer, that is associated with the third slice or picture; and store, in the buffer, a fourth set of temporal initialization points associated with the second slice or picture based on the determined one or more context values for at least one context used for encoding or decoding the second slice or picture.

Clause 17A. The device of any of clauses 11A-16A, wherein the processing circuitry is configured to: determine a set of temporal initialization points stored in the buffer; initialize one or more context values for at least one context used for encoding or decoding a subsequent slice or picture based on the determined set of temporal initialization points; and context-based arithmetic encode or decode the subsequent slice or picture.

Clause 18A. The device of clause 17A, wherein the processing circuitry is configured to: determine a temporal identification value for the subsequent slice or picture; determine that none of two or more slices or pictures having associated sets of temporal initialization points stored in the buffer have a temporal identification value equal to the temporal identification value for the subsequent slice or picture; determine a second slice or picture from among the two or more slices or pictures having a temporal identification value that is closest to and less than the temporal identification value of the subsequent slice or picture, wherein to determine the set of temporal initialization points, the processing circuitry is configured to select the set of temporal initialization points associated with the second slice or picture.

Clause 19A. The device of clause 17A, wherein the processing circuitry is configured to: determine a QP value for the subsequent slice or picture; determine that none of two or more slices or pictures having associated sets of temporal initialization points stored in the buffer have a QP value equal to the QP value for the subsequent slice or picture; determine a second slice or picture from among the two or more slices or pictures having a QP value that is closest to the QP value of the subsequent slice or picture, wherein to determine the set of temporal initialization points, the processing circuitry is configured to select the set of initialization points associated with the second slice or picture.

Clause 20A. The device of any of clauses 11A-19A, wherein to store the second set of initialization points the processing circuitry is configured to, subsequent to processing a last coding tree unit (CTU) of the current slice or picture, store the second set of temporal initialization points.

Clause 21A. The device of any of clauses 11A-20A, wherein the device comprises one or more of a camera, a computer, a mobile device, a broadcast receiver device, or a set-top box.

Clause 22A. A computer-readable storage medium storing instructions thereon that when executed cause one or more processors to: determine one or more context values for at least one context used for encoding or decoding a current slice or picture; determine that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; determine a first set of temporal initialization points associated with a slice or picture, from among the two or more slices or pictures, based on at least one of a slice type, a temporal identification value, or quantization parameter (QP) value of the slice or picture; remove the first set of temporal initialization points, from the buffer, that is associated with the slice or picture; and store, in the buffer, a second set of temporal initialization points associated with the current slice or picture, wherein the second set of temporal initialization points are based on the determined one or more context values.

Clause 23A. The computer-readable storage medium of clause 22A, further comprising instructions that cause the one or more processors to perform the method of any of clauses 1A-10A.

Clause 24A. A device for processing video data, the device comprising: means for determining one or more context values for at least one context used for encoding or decoding a current slice or picture; means for determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points; means for determining a first set of temporal initialization points associated with a slice or picture, from among the two or more slices or pictures, based on at least one of slice type, a temporal identification value, or a quantization parameter (QP) value of the slice or picture; means for removing the first set of temporal initialization points, from the buffer, that is associated with the slice or picture; and means for storing, in the buffer, a second set of temporal initialization points associated with the current slice or picture, wherein the second set of temporal initialization points are based on the determined one or more context values.

Clause 25A. The device of clause 24A, further comprising instructions that cause the one or more processors to perform the method of any of clauses 1A-10A.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of processing video data, the method comprising:

determining one or more context values for at least one context used for encoding or decoding a current slice or picture;

determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points;

determining a first set of temporal initialization points associated with a slice or picture, from among the two or more slices or pictures, having at least one of a smallest temporal identification value or quantization parameter (QP) value from among temporal identification values or QP values of the two or more slices or pictures, wherein the temporal identification value or QP value of the slice or picture associated with the first set of temporal initialization points is different than a temporal identification value or QP value of the current slice or picture;

removing the first set of temporal initialization points, from the buffer, that is associated with the slice or picture; and subsequent to processing a last coding tree unit (CTU) of the current slice or picture, storing, in the buffer, a second set of temporal initialization points associated with the current slice or picture, wherein the second set of temporal initialization points are based on the determined one or more context values.

2. The method of claim 1, wherein determining the slice or picture having at least one of the smallest temporal identification value or QP value from among the two or more slices or pictures comprises determining the slice or picture having the smallest temporal identification value from among temporal identification values of the two or more slices or pictures.

3. The method of claim 1, wherein determining the slice or picture having at least one of the smallest temporal identification value or QP value from among the two or more slices or pictures comprises determining the slice or picture having the smallest QP value from among QP values of the two or more slices or pictures.

4. The method of claim 1, wherein the current slice or picture is a first slice or picture, the method further comprising:

determining one or more context values for at least one context used for encoding or decoding a second slice or picture;

determining a third slice or picture, from the two or more slices or pictures, having at least one of a temporal identification value, QP value, or slice type that is same as a temporal identification value, QP value, or slice type of the second slice or picture;

removing a third set of temporal initialization points, from the buffer, that is associated with the third slice or picture; and storing, in the buffer, a fourth set of temporal initialization points associated with the second slice or picture based on the determined one or more context values for at least one context used for encoding or decoding the second slice or picture.

5. The method of claim 1, further comprising:

determining a third set of temporal initialization points stored in the buffer;

initializing one or more context values for at least one context used for encoding or decoding a subsequent slice or picture based on the third set of temporal initialization points; and context-based arithmetic encoding or decoding the subsequent slice or picture.

6. The method of claim 5, further comprising:

determining a temporal identification value for the subsequent slice or picture;

determining that none of two or more slices or pictures having associated sets of temporal initialization points stored in the buffer have a temporal identification value equal to the temporal identification value for the subsequent slice or picture; and determining a second slice or picture from among the two or more slices or pictures having a temporal identification value that is closest to and less than the temporal identification value of the subsequent slice or picture, wherein determining the third set of temporal initialization points comprises selecting the third set of temporal initialization points associated with the second slice or picture.

7. The method of claim 5, further comprising:

determining a QP value for the subsequent slice or picture;

determining that none of two or more slices or pictures having associated sets of temporal initialization points stored in the buffer have a QP value equal to the QP value for the subsequent slice or picture; and determining a second slice or picture from among the two or more slices or pictures having a QP value that is closest to the QP value of the subsequent slice or picture, wherein determining the third set of temporal initialization points comprises selecting the third set of initialization points associated with the second slice or picture.

8. A device for processing video data, the device comprising:

a buffer configured to store sets of temporal initialization points from two or more slices or pictures for context-based arithmetic coding; and processing circuitry coupled to the buffer, the processing circuitry configured to:

determine one or more context values for at least one context used for encoding or decoding a current slice or picture;

determine that the buffer for storing the sets of temporal initialization points from the two or more slices or pictures for context-based arithmetic coding is full, wherein each set of temporal initialization points is associated with a slice or picture of the two or more slices or pictures and includes one or more temporal initialization points;

determine a first set of temporal initialization points associated with a slice or picture, from among the two or more slices or pictures, having at least one of a smallest temporal identification value or quantization parameter (QP) value from among temporal identification values or QP values of the two or more slices or pictures, wherein the temporal identification value or QP value of the slice or picture associated with the first set of temporal initialization points is different than a temporal identification value or QP value of the current slice or picture;

remove the first set of temporal initialization points, from the buffer, that is associated with the slice or picture; and subsequent to processing a last coding tree unit (CTU) of the current slice or picture, store, in the buffer, a second set of temporal initialization points associated with the current slice or picture, wherein the second set of temporal initialization points are based on the determined one or more context values.

9. The device of claim 8, wherein to determine the slice or picture having at least one of the smallest temporal identification value or QP value from among the two or more slices or pictures, the processing circuitry is configured to determine the slice or picture having the smallest temporal identification value from among temporal identification values of the two or more slices or pictures.

10. The device of claim 8, wherein to determine the slice or picture having at least one of the smallest temporal identification value or QP value from among the two or more slices or pictures, the processing circuitry is configured to determine the slice or picture having the smallest QP value from QP values of the two or more slices or pictures.

11. The device of claim 8, wherein the current slice or picture is a first slice or picture, and wherein the processing circuitry is configured to:

determine one or more context values for at least one context used for encoding or decoding a second slice or picture;

determine a third slice or picture, from the two or more slices or pictures, having at least one of a temporal identification value, QP value, or slice type that is same as a temporal identification value, QP value, or slice type of the second slice or picture;

remove a third set of temporal initialization points, from the buffer, that is associated with the third slice or picture; and store, in the buffer, a fourth set of temporal initialization points associated with the second slice or picture based on the determined one or more context values for at least one context used for encoding or decoding the second slice or picture.

12. The device of claim 8, wherein the processing circuitry is configured to:

determine a third set of temporal initialization points stored in the buffer;

initialize one or more context values for at least one context used for encoding or decoding a subsequent slice or picture based on the third set of temporal initialization points; and context-based arithmetic encode or decode the subsequent slice or picture.

13. The device of claim 12, wherein the processing circuitry is configured to:

determine a temporal identification value for the subsequent slice or picture;

determine that none of two or more slices or pictures having associated sets of temporal initialization points stored in the buffer have a temporal identification value equal to the temporal identification value for the subsequent slice or picture; and determine a second slice or picture from among the two or more slices or pictures having a temporal identification value that is closest to and less than the temporal identification value of the subsequent slice or picture, wherein to determine the third set of temporal initialization points, the processing circuitry is configured to select the third set of temporal initialization points associated with the second slice or picture.

14. The device of claim 12, wherein the processing circuitry is configured to:

determine a QP value for the subsequent slice or picture;

determine that none of two or more slices or pictures having associated sets of temporal initialization points stored in the buffer have a QP value equal to the QP value for the subsequent slice or picture; and determine a second slice or picture from among the two or more slices or pictures having a QP value that is closest to the QP value of the subsequent slice or picture, wherein to determine the third set of temporal initialization points, the processing circuitry is configured to select the third set of initialization points associated with the second slice or picture.

15. The device of claim 8, wherein the device comprises one or more of a camera, a computer, a mobile device, a broadcast receiver device, or a set-top box.

16. A computer-readable storage medium storing instructions thereon that when executed cause one or more processors to:

determine one or more context values for at least one context used for encoding or decoding a current slice or picture;

determine that a buffer for storing sets of temporal initialization points from two or more slices or pictures for context-based arithmetic coding is full, wherein each set of temporal initialization points is associated with a slice or picture of the two or more slices or pictures and includes one or more temporal initialization points;

determine a first set of temporal initialization points associated with a slice or picture, from among the two or more slices or pictures, having at least one of a smallest temporal identification value or quantization parameter (QP) value from among temporal identification values or QP values of the two or more slices or pictures, wherein the temporal identification value or QP value of the slice or picture associated with the first set of temporal initialization points is different than a temporal identification value or QP value of the current slice or picture;

remove the first set of temporal initialization points, from the buffer, that is associated with the slice or picture; and subsequent to processing a last coding tree unit (CTU) of the current slice or picture, store, in the buffer, a second set of temporal initialization points associated with the current slice or picture, wherein the second set of temporal initialization points are based on the determined one or more context values.

17. A device for processing video data, the device comprising:

means for determining one or more context values for at least one context used for encoding or decoding a current slice or picture;

means for determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points;

means for determining a first set of temporal initialization points associated with a slice or picture, from among the two or more slices or pictures, having at least one of a smallest temporal identification value or quantization parameter (QP) value from among temporal identification values or QP values of the two or more slices or pictures, wherein the temporal identification value or QP value of the slice or picture associated with the first set of temporal initialization points is different than a temporal identification value or QP value of the current slice or picture;

means for removing the first set of temporal initialization points, from the buffer, that is associated with the slice or picture; and means for storing, in the buffer, a second set of temporal initialization points associated with the current slice or picture subsequent to processing a last coding tree unit (CTU) of the current slice or picture, wherein the second set of temporal initialization points are based on the determined one or more context values.

18. A method of processing video data, the method comprising:

determining one or more context values for at least one context used for encoding or decoding a current slice or picture;

determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points;

determining a first set of temporal initialization points associated with a slice or picture, from among the two or more slices or pictures, based on at least one of a slice type, a temporal identification value, or a quantization parameter (QP) value of the slice or picture, wherein determining the first set of temporal initialization points comprises determining the first set of temporal initialization points associated with the slice or picture, from among the two or more slices or pictures, having a smallest temporal identification value from among temporal identification values of the two or more slices or pictures;

removing the first set of temporal initialization points, from the buffer, that is associated with the slice or picture; and storing, in the buffer, a second set of temporal initialization points associated with the current slice or picture, wherein the second set of temporal initialization points are based on the determined one or more context values.

19. A method of processing video data, the method comprising:

determining one or more context values for at least one context used for encoding or decoding a current slice or picture;

determining that a buffer for storing sets of temporal initialization points from two or more slices or pictures for context-based arithmetic coding is full, wherein each set of temporal initialization points is associated with a slice or picture of the two or more slices or pictures and includes one or more temporal initialization points;

determining a first set of temporal initialization points associated with a slice or picture, from among the two or more slices or pictures, based on at least one of a slice type, a temporal identification value, or a quantization parameter (QP) value of the slice or picture, wherein determining the first set of temporal initialization points comprises determining the first set of temporal initialization points associated with the slice or picture, from among the two or more slices or pictures, having a smallest QP value from among QP values of the two or more slices or pictures;

removing the first set of temporal initialization points, from the buffer, that is associated with the slice or picture; and storing, in the buffer, a second set of temporal initialization points associated with the current slice or picture, wherein the second set of temporal initialization points are based on the determined one or more context values.

* * * * *